United States Patent
Miner

(10) Patent No.: US 11,005,335 B2
(45) Date of Patent: May 11, 2021

(54) SYSTEMS AND METHODS FOR PROVIDING ENHANCED MECHANICAL/ELECTRICAL ENERGY STORAGE

(71) Applicant: Joshua Robert Miner, Ashburn, VA (US)

(72) Inventor: Joshua Robert Miner, Ashburn, VA (US)

(*) Notice: Subject to any disclaimer, the term of this patent is extended or adjusted under 35 U.S.C. 154(b) by 336 days.

(21) Appl. No.: 16/121,604

(22) Filed: Sep. 4, 2018

(65) Prior Publication Data

US 2019/0140514 A1 May 9, 2019

Related U.S. Application Data

(60) Provisional application No. 62/553,787, filed on Sep. 1, 2017.

(51) Int. Cl.
| | |
|---|---|
| *H02K 7/02* | (2006.01) |
| *F16F 15/30* | (2006.01) |
| *H02K 21/02* | (2006.01) |

(52) U.S. Cl.
CPC ............ *H02K 7/025* (2013.01); *F16F 15/30* (2013.01); *H02K 21/021* (2013.01); *H02K 2213/09* (2013.01)

(58) Field of Classification Search
CPC .......... H02K 7/02; H02K 7/025; H02K 21/22; H02K 21/222; H02K 21/225; H02K 21/227; Y02E 60/16
See application file for complete search history.

(56) References Cited

U.S. PATENT DOCUMENTS

| | | | |
|---|---|---|---|
| 2015/0300448 A1* | 10/2015 | Murphy | F16C 32/0417 310/90.5 |
| 2016/0285329 A1* | 9/2016 | Knapp | H02K 49/106 |
| 2016/0315521 A1* | 10/2016 | Gimlan | B60L 7/14 |
| 2019/0165659 A1* | 5/2019 | Hattori | H02K 7/06 |
| 2019/0210717 A1* | 7/2019 | Lauder | H02K 21/24 |
| 2019/0372449 A1* | 12/2019 | Mills | G21B 3/00 |

* cited by examiner

*Primary Examiner* — Quyen P Leung
*Assistant Examiner* — Minki Chang

(57) ABSTRACT

An energy apparatus that stores and disperses energy, the energy apparatus including: (1) an energy object that experiences movement so as to store kinetic energy in the energy object, the energy object including a magnet assembly through which electrons are driven resulting in electric output from the magnet assembly, and the electric output dependent on experienced EMF (electro-motive force) that is experienced by the magnet assembly; (2) a supporting structure that supports the energy object while providing for the movement of the energy object; (3) a first tuning magnet that is supported adjacent the energy object, the first tuning magnet positionable throughout a range of positions, the positions including a first position and a second position; (4) a second tuning magnet that is supported adjacent to the energy object.

16 Claims, 27 Drawing Sheets

Fig. 15 (Top View)

(Top View)

(Top View)

(Top View)

(Top View)

(Top Perspective View)

(Side View)

Variable Linear AC Battery 2600

Fig. 26 (perspective)

KNOWN

SYSTEMS AND METHODS FOR PROVIDING ENHANCED MECHANICAL/ELECTRICAL ENERGY STORAGE

RELATED PATENT APPLICATION

This application claims priority to U.S. Provisional Patent Application 62/553,787 filed Sep. 1, 2017, the content of which is incorporated herein by reference in its entirety.

BACKGROUND OF THE DISCLOSURE

Known technology is lacking in providing a truly effective system which is able to be charged and hold energy for a period of time before exerting the inputted energy. The systems and methods of the disclosure address various shortcomings of known systems.

SUMMARY OF THE DISCLOSURE

Systems and methods are provided that include an energy apparatus that stores and disperses energy, the energy apparatus comprising: (1) an energy object that experiences movement so as to store kinetic energy in the energy object, the energy object including a magnet assembly through which electrons are driven resulting in electric output from the magnet assembly, and the electric output dependent on experienced EMF (electro-motive force) that is experienced by the magnet assembly; (2) a supporting structure that supports the energy object while providing for the movement of the energy object; (3) a first tuning magnet that is supported adjacent the energy object, the first tuning magnet positionable throughout a range of positions, the positions including a first position and a second position; (4) a second tuning magnet that is supported adjacent to the energy object; wherein: (a) in the first position, the first tuning magnet possesses a first spatial relationship with the second tuning magnet that results in a first aggregation of EMF, and the first aggregation of EMF resulting in the experienced EMF being a first experienced EMF, and the first experienced EMF, with the movement of the energy object, resulting in the electric output being a first electric output, and (b) in the second position, the first tuning magnet possesses a second spatial relationship with the second tuning magnet that results in a second aggregation of EMF, and the second aggregation of EMF resulting in the experienced EMF being a second experienced EMF, and the second experienced EMF, with the movement of the energy object, resulting in the electric output being a second electric output.

BRIEF DESCRIPTION OF THE DRAWINGS

The present disclosure can be more fully understood by reading the following detailed description together with the accompanying drawings, in which like reference indicators are used to designate like elements, and in which.

DETAILED DESCRIPTION OF THE DISCLOSURE

Hereinafter, aspects of the disclosure in accordance with various embodiments will be described. As used herein, any term in the singular may be interpreted to be in the plural, and alternatively, any term in the plural may be interpreted to be in the singular.

As described above, known technology is lacking in providing an effective system which is able to be charged and hold energy for a period of time before exerting the inputted energy.

Figure 27:
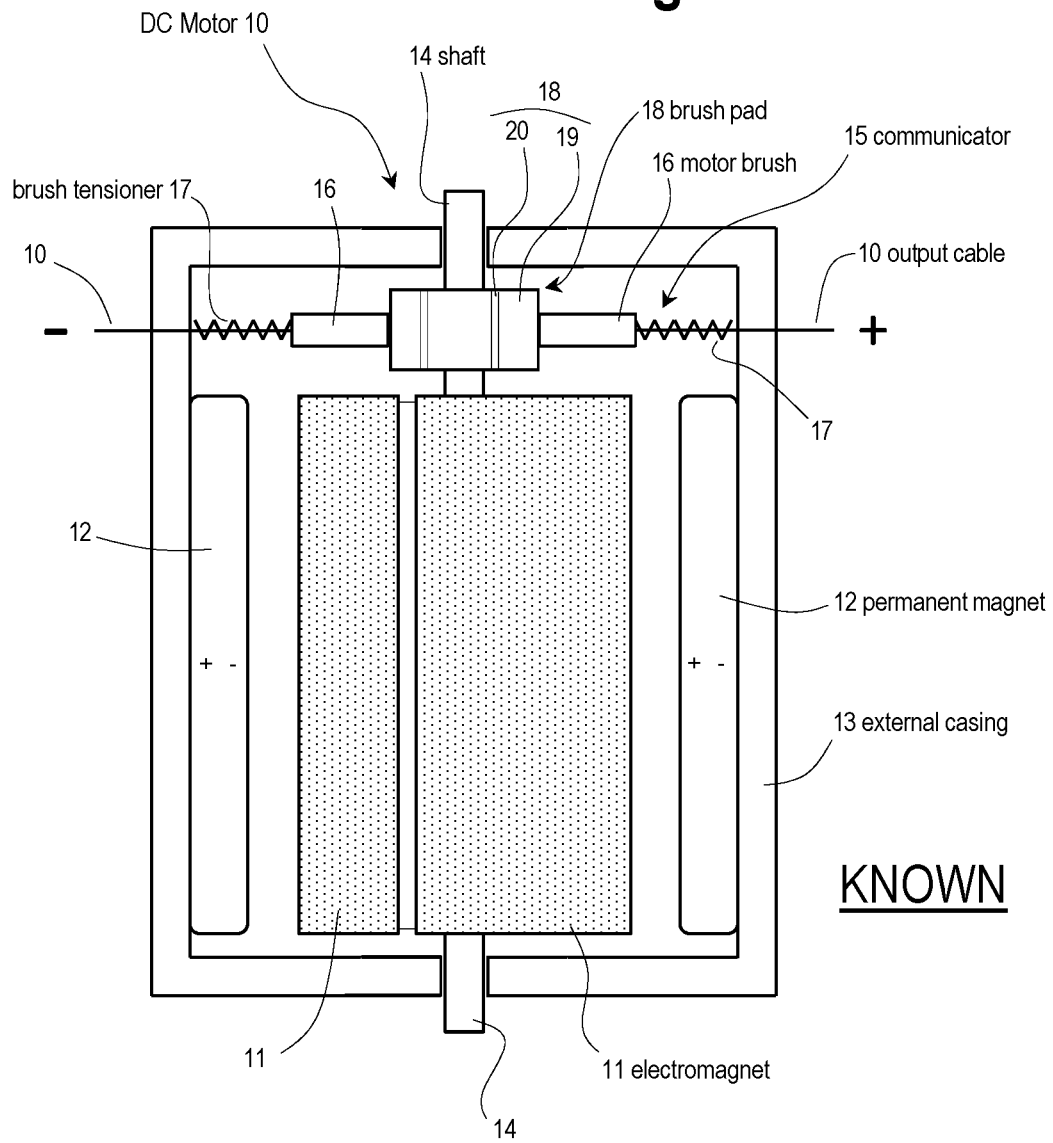
FIG. 27 is a schematic diagram of a motor.

Relatedly, FIG. 27 is a schematic diagram showing a common, known DC motor 10. A DC or Direct Current motor can utilize an electromotive force (EMF), generated by the interaction of a rotating electromagnet 11 with or in a magnetic field. This magnetic field is commonly generated by a permanent magnet 12 that is fixed to the external casing 13. Many common DC motors position the rotating electromagnets 11 around and fixed to a shaft 14 which rotates within the external casing 13. The permanent magnets 20 can have an orientation normal with respect to the rotation of the electromagnets 10 around a shaft 50.

In operation, DC motors can require a stream of current to the rotating electromagnets 10, i.e. to accelerate the electromagnets 11 under such external electrical input. As a result, the motor outputs power via shaft 14. Alternatively, the electromagnets 10 can also generate electricity via electromotive force due to the conversion of rotational kinetic energy to electrical output, i.e. if the shaft 14 is turned under an external application of force applied to the shaft.

Current is input or output from the motor via a communicator 15, which bridges the gap from the rotating electromagnets 10 to output wires or cables 10. The communicator 15, for each output, can include a motor brush 16, a brush tensioner 17, and a brush pad 18. The brush tensioner 17 can be a spring, for example, that applies pressure to the motor brush 16—so that the motor brush 16 presses against the brush pad 18. The brush pad 18 is fixed to and rotates with the motor. The brush pad 18 can include multiple conductive sections 19 and multiple insulated sections 20. The insulated sections 20 serve to separate two adjacent conductive sections 19. In known manner, as the shaft 14 rotates, each of the motor brushes 16 respectively switch from conductive section 19 to conductive section 19, in synch with respective alternating of the push and pull, and position, of the electromagnets 11 vis-à-vis the permanent magnets 12.

An AC motor utilizes many of the same components as a DC motor, except in the AC motor the electromagnets can be placed in the external casing of the system, and the permanent magnets around a rotating shaft. This type of motor additionally lacks a communicator, since the alternating of current as the motor spins can be handled by the alternating inherent in the AC current. An AC motor and DC Motor can act as a motor in the normal manner, as well as act as a generator if external force is applied to the shaft of the motor.

As used herein, a "motor" can be understood to be a structure that can input electrical energy and convert that electrical energy to physical energy. Such physical energy can be in the form of rotating a mechanical component, such as an output shaft. The output shaft can be connected to a flywheel and operate to bring the flywheel up to a desired rotational speed, so as to store energy. Alternatively, if the output shaft of such "motor" is rotated, then the motor indeed acts to output electrical energy. Accordingly, such "motor" can act as a generator—or in other words, such "motor" can be a "generator".

Systems and methods of the disclosure as described herein provide an alternative to traditional batteries, such as chemical batteries. The disclosure provides systems and methods to effectively store energy in a physical form. The disclosure, in one aspect, provides the ability to take high watt input energy and convert such input energy into a mechanical force, for example kinetic energy in rotation of a flywheel structure, before pulling energy off the mechanical force created. The energy can be pulled off at a slower pace than such energy was originally input. Also, energy can be pulled off at a desired pace. The disclosure provides both features relating to storing energy (at an initial time) faster than the energy is utilized (at a later time) as well as various related features.

Various methodologies are provided to store energy faster than the energy is exported or "pulled off" the battery. Energy may be exported using various structure, which may respectively include advantages and drawbacks. An aspect of technology, of the disclosure, is the ability to utilize movable magnets to change the magnetic field experienced by an electric motor/generator, which includes what may be characterized as "original magnets". In a common motor, these "original magnets" can be stationary magnets that interact with "electromagnets" that are mounted on, and rotate with, a shaft of the motor. Accordingly, a variable output system can be provided to produce desired current by either having (a) the movable magnets fight against the strength of "original" magnets so as to create a neutral or lessoned magnetic field experienced by the electromagnets (of the motor), or (b) the movable magnets enhance the strength of the original magnets so as to create an enhanced magnetic field experienced by the electromagnets (of the motor). A system of the disclosure can include a set of magnets that are drawn in or pulled out of (or away from) a motor structure so as to create a desired electrical output, as described below. A system of the disclosure can include a single magnet that is either drawn in or pulled out of (or away from) a motor structure so as to create a desired electrical output. Applications of the energy storage or battery of the disclosure can include vehicles and personal power banks for personal devices, as well as a wide variety of other applications.

As used herein, a "battery" may be characterized as a system which is able to input energy in a charging process, hold the input energy for a period of time, and then output the stored energy as needed or desired.

In accordance with at least one aspect of the disclosure, the disclosure provides a battery system that can store energy at a faster rate with higher originating watts/torque/speed into a physical form within the system, than when energy is pulled off the system. The energy may be output to any energy consuming device as may be desired—so that such energy consuming device can perform its designated operation. In accordance with embodiments of the disclosure, a change in power input wattage and output wattage, of a system of the disclosure, can either be performed with, for example, a multistage output system or a magnetic manipulation system, as described below.

In accordance with at least one embodiment of the disclosed subject matter, the disclosure provides a battery that utilizes or is exposed to a physical force. As a result of such exertion of physical force, energy is collected and stored in the battery in a kinetic form, e.g. in a rotating flywheel. The system provides the opportunity or ability to pull the stored energy off (of the battery) to power another system, component, or item.

As used herein, a chemical battery may be characterized as a battery which utilizes a chemical solution to store energy in a non inertial form.

In accordance with the disclosed subject matter, the technology provides a system and methodology to decrease charging time of the described battery, in accordance with the disclosed subject matter, and to maximize efficiency in power transference (after charging).

The disclosure can provide a physical system to store energy in a mechanical form in a physical mass, in conjunction with the energy being introduced into the system in an electrical form. Such may, for example, include the speeding up of a flywheel. Later, the energy stored in the physical mass can be output in an electrical form, i.e. electrical energy can be output in conjunction with a slowing down of the flywheel as energy is pulled off the system.

In accordance with the disclosure, power storage can be provided that includes a gyroscopic wheel or flywheel spinning at a designated speed. A "power-up motor" can be used to input the initial power or energy that is stored. A secondary motor or what can be characterized as an "original" or "generating motor", can be used to generate, using the stored energy, the power of the system. In accordance with one embodiment of the disclosure, the generating motor can be part of a DC motor system, an AC motor system, or another power generation system. The power-up motor, to speed up a flywheel for example, can be or be a part of a DC motor, an AC motor, or another type of motor.

Accordingly, different types of motors, such as an AC electric motor or a DC electric motor, can be used to input energy, rotation, power and/or torque to the system. However, other arrangements can be used to input energy, i.e. for example to speed up a flywheel.

A battery of the disclosure can be used in a vehicle. Illustratively, a very powerful, high watt power-up motor can be available, such as provided at a "service station" on the highway. Such power-up motor can be physically connected to the flywheel, of the battery on the vehicle, and "speed up" the flywheel so as to store energy in the form of kinetic energy. This stored energy can then be used, as needed, by a much smaller motor on the vehicle, wherein the motor on the vehicle is part of a battery system of the disclosure.

In accordance with at least one embodiment of the disclosed subject matter, kinetic energy, stored in the rotational speed of a flywheel for example, is accessed, pulled from, or syphoned from, so as to output power. Accordingly, rotational speed or rotational momentum of the flywheel, of the system, is converted into electricity. In accordance with an aspect of the disclosed subject matter, the system can provide an ability to output power (from the "generating motor") at a different rate than power was input into the system from (from the "power-up motor"). In accordance with at least one embodiment of the disclosed subject matter, the "generating motor" can be the same as "power-up motor", i.e. a single motor can perform both operations or functions of both the "generating motor" and the "power-up motor", The "generating motor" as described herein might also be characterized as a "generator".

As described herein, in some systems of the disclosure multiple motors may be used. In a multiple motor system of the disclosure, the system can include a flywheel. The flywheel can be respectively connected to the multiple motors, which can be separate and include a power-up motor and a generating motor. A "staging" arrangement or system can be provided between the power-up motor and the flywheel. Such "staging" arrangement can allow the power-up motor to turn the flywheel but not the flywheel to turn the power-up motor. Examples of a staging system can include a one-way transmission, or a ratchet arrangement. Accordingly, the power-up motor can be "cut out" or disconnected from the flywheel when the power-up motor is not supplying power to perform initial speed up or speed up of the flywheel. In other words, once the power-up motor has rotationally accelerated the flywheel to the desired rotational speed, the power-up motor can then become isolated from other components of the system including, in particular, isolated from the flywheel and the power-up motor. Accordingly, the power-up motor can be disconnected from the flywheel and stop turning while the flywheel continues to turn.

The second motor, i.e. the generating motor, which is attached to the flywheel is then able to act or perform as a generator, which can supply an output of electrical current. This secondary motor, i.e. the generating motor, can generate a differing amount of power as compared to the power-up motor. For example. the generating motor can generate a different wattage than was initially inputted by the power-up motor. Accordingly, the system can act as a battery, which can take in current for a certain period of time at high watts from the power-up motor, while speeding up a physical mass, before using a separate motor (the generating motor) to generate a smaller amount of wattage for a longer period of time, when compared to the initial input watts and time duration of the power-up motor.

A system of the disclosure may also utilize a single motor system. In a single motor system, a single motor can be provided which is connected to a mass. This single motor can be surrounded by magnetic bodies. The magnetic bodies can be manipulated by a one, a plurality, or a series of simple machinery. The magnetic bodies, which can encompass the single motor, can be rotated or spaced, around the motor in different arrangements, so to alter the magnetic field that is present, i.e. the magnetic field that the motor experiences. This altering of the magnetic field can decrease or increase the power generation and input torque/speed of the system. That is, by manipulating the magnetic bodies and their spatial relationship to the magnets in the motor, the system can increase the magnetic field upon speeding up or to speed up the motor (and consequently to speed up the flywheel), before decreasing the magnetic field upon the flywheel being in motion (i.e. in a power generation state). Accordingly, such increase in magnetic strength in the initial storage of energy can allow the motor to act as a strong input motor when needed to initially store energy (by speeding up a flywheel for example). Then, the decrease in magnetic field would allow the motor to act as a weaker motor, i.e. as a generator, when the flywheel is in motion—and expending the energy of the flywheel to create electricity.

Accordingly, the systems and methods of the invention can manipulate a magnetic field around and in a motor so as to vary an electromotive force (EMF) that is experienced in the interior of the motor—and in particular the EMF force that is experienced by the electromagnets of the motor that are attached to a turning shaft of the motor. Accordingly, the systems and methods of the disclosure can manipulate a magnetic field in a particular manner, around and in the motor, to first store energy in a physical form—and at a later time—convert that stored energy to an electrical output.

The technology of the disclosure can be helpful to the battery industry, because it can allow batteries that utilize a weighted flywheel, i.e. a flywheel having mass, to store energy at a faster rate than the energy is ultimately used, a feat not usually possible by modern flywheel style batteries or chemical batteries. An improvement provided by the systems and methods of the invention is the manipulation of magnets about a rotatable axis, about which a motor/generator is mounted, that can provide variable internal magnetic fields to draw off energy as desired. The motor/generator can be energized by a mechanically connected rotating flywheel. Energy can be drawn off at a desired amount/rate in order to efficiently produce current, i.e. electrical output, as needed. By having a current that matches the required amount for the task at hand, a very effective and efficient system is created, which is able to use its energy for the longest period of time possible.

In accordance with embodiments of the disclosure, components of a system of the disclosure may be fastened or contained within an encasement. One attribute of the encasement can be to mitigate or lesson resistance of rotation, such as frictional forces, and provide the highest possible transfer of energy from the power-up motor to the energy storage device, for example a flywheel. Another attribute of the encasement can be to mitigate or lesson resistance and provide the highest possible transfer of energy from energy storage device, for example a flywheel, to the generating motor—so as to provide output energy. The output energy can be used to power a car, for example.

Lowering resistance of a system of the disclosure may, for example, involve lowering the resistance of the shaft attachment assembly that attaches a shaft of the motor to a housing of the motor. Resistance may also be lowered by minimizing air resistance. Some examples of lowering shaft resistance can include (a) using magnetic bearings with minimal or no friction based resistance, (b) using perfectly or well weighted objects to minimize oscillation or vibration that can result in a loss of power transference, and (c) providing a completely circular component based system to decrease air resistance caused by rotation, and avoid vacuum pockets by not using or minimizing the use of non-circular parts. The speed of the system, i.e. of the energy storage device such as a flywheel, can be a substantial influence on the viability of the technology. Such speed of the energy storage device of the system can determine or limit a maximum power storage of a system of the disclosure.

A battery of the disclosure may operate within a confined space and include a flywheel, for example, having a predetermined mass. A battery of the disclosure can utilize a light weight mass, such as, for example 50 pounds, or any size mass as may be desired. If a specified energy storage capability is needed, mass of a flywheel and speed of the flywheel can dictate stored energy that the flywheel possesses. For a given energy storage needed, rotational speed may be exchanged for mass. In other words, to provide a requisite amount of energy stored, as mass of a flywheel is decreased then speed of the flywheel would need to be increased in a proportional manner. Accordingly, mass of flywheel can be exchanged for speed of flywheel, while maintaining the same power storage capabilities, since potential energy is a factor of both speed and mass.

The systems and methods described herein can help revolutionize the battery industry, and provide technology to make the battery industry more "physical battery based" and less chemical battery based. Some of the applications for batteries of the disclosure would be in electrical cars, industrial machinery, and electronic systems of medium to large size which can need to be used for long periods of time and that can require quick charge cycle. Batteries of the disclosure can also provide the benefit of not being easily breakable. Compared to traditional batteries which wear down in a short amount of time, these physical batteries of the disclosure can be used for many years, without malfunction, or breakdown.

In accordance with at least one aspect, systems and methods of the disclosure can help convert the planet Earth from a fossil fuel based energy system to an electrical system, powered by highly efficient and green technology. This can help with issues such as global warming, and help humanity make the transition to all electric power before the fossil fuels on our planet run out.

Figure 1:
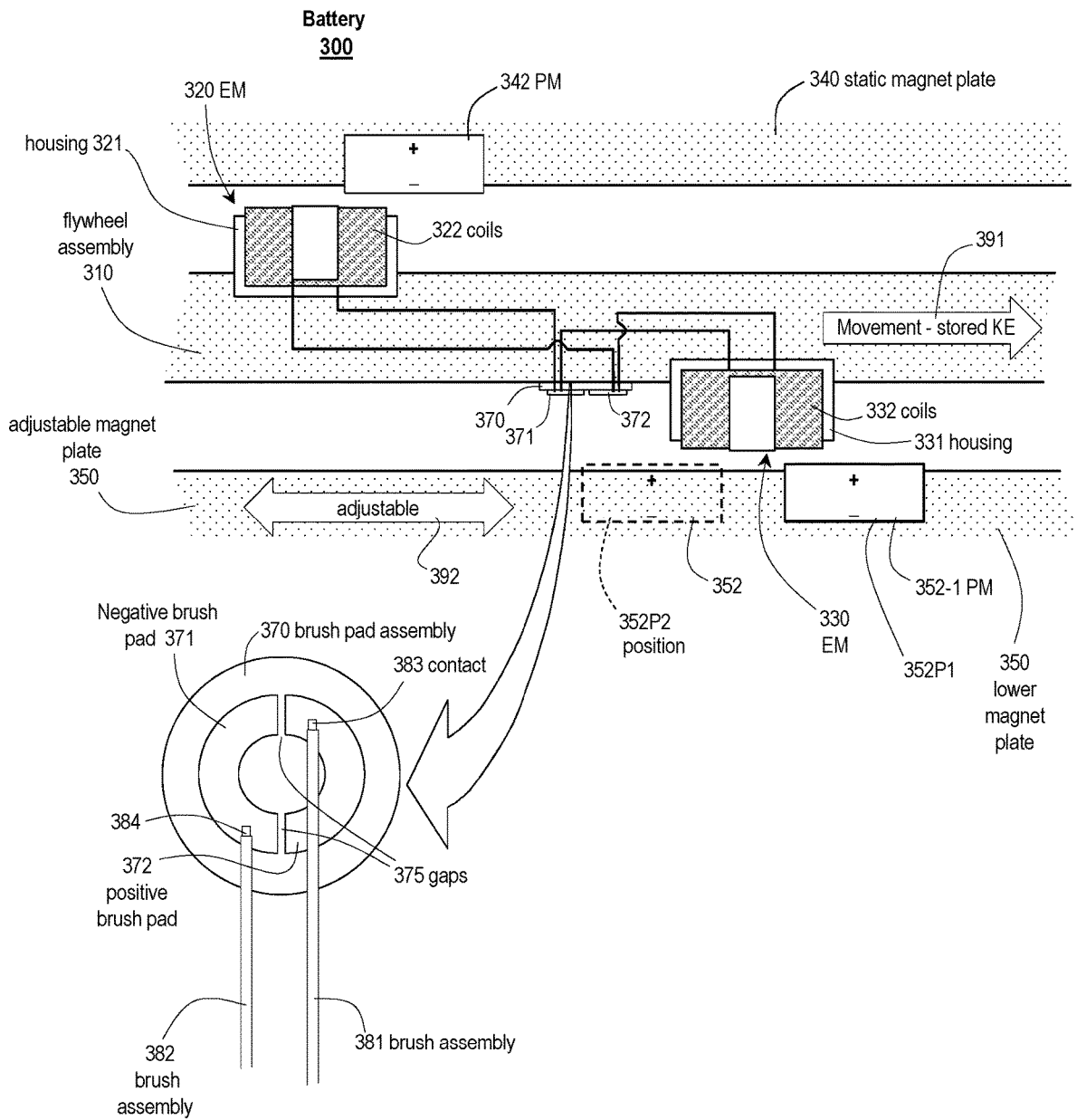
FIG. 1 is a schematic diagram of a battery assembly or battery, in accordance with at least one embodiment of the disclosure.
Figure 2:
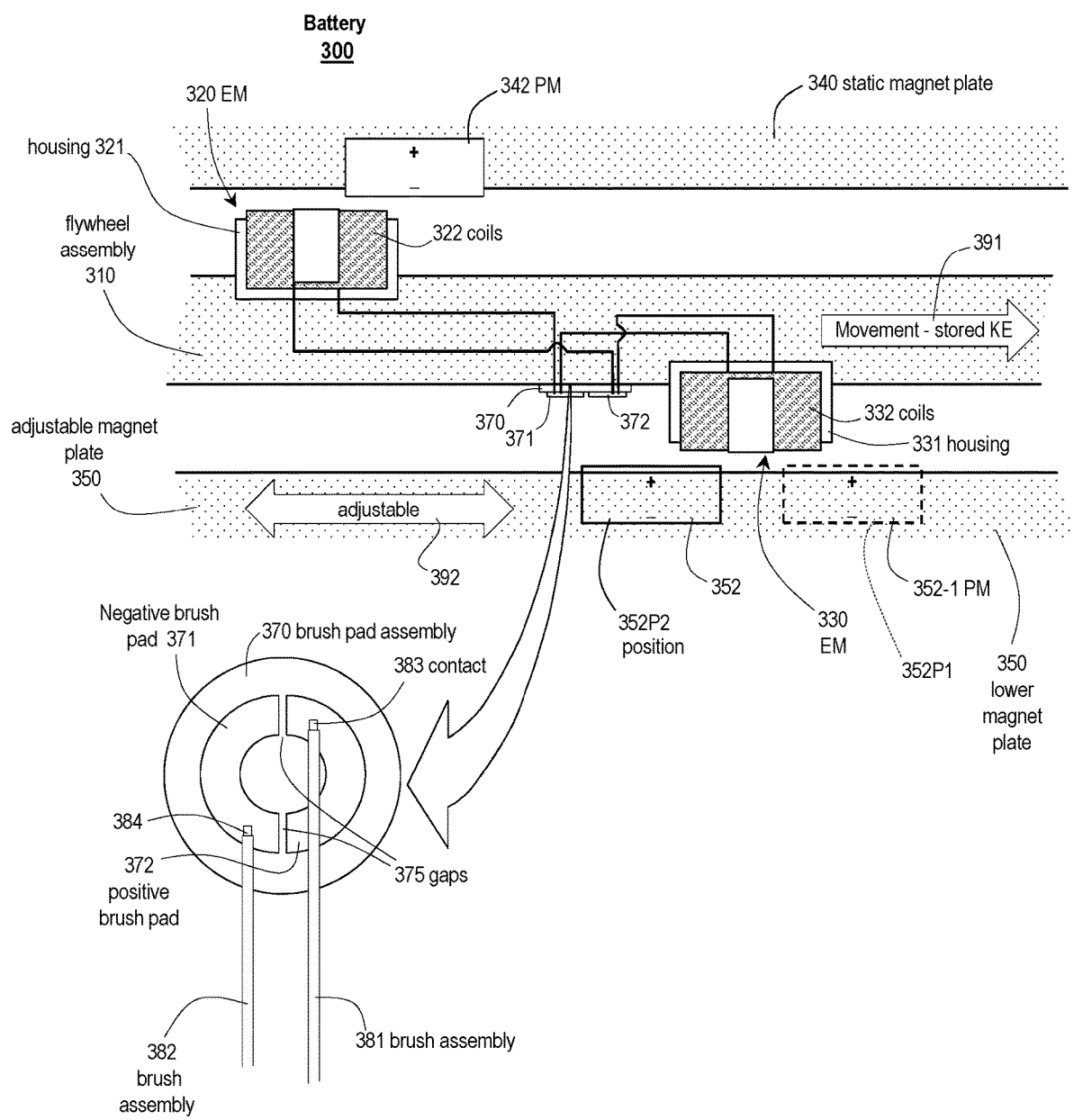
FIG. 2 is a schematic diagram of the battery assembly or battery of FIG. 1 showing a different arrangement, in accordance with at least one embodiment of the disclosure.

FIG. 1 is a diagram of a battery assembly or battery 300, in accordance with at least one embodiment of the disclosure. The battery assembly 300 includes a flywheel assembly 310. The flywheel assembly 310 includes electromagnet 320 and electromagnet 330. The flywheel assembly 310, along with the electromagnets 320, 330, rotate or spin. It is this rotation, or movement 391 as illustrated in FIG. 1, of the flywheel assembly 310, that constitutes stored kinetic energy of the battery assembly 300. As the flywheel assembly 310 rotates or spins faster, such increased rotation speed constitutes more stored energy. The flywheel can be characterized as an energy object. As shown in FIG. 1, electromagnets are mounted on the flywheel assembly 310. Such electromagnets variably interact with one or more respective permanent magnets. This interaction can result in the battery 300 not outputting electrical energy, as shown in the arrangement of FIG. 1. This interaction can result in the battery 300 outputting electrical energy, as shown in the arrangement of FIG. 2. If the battery 300 does not output electrical energy, the battery can maintain a state of free spin (absent minimal frictional forces) and in such state of free spin the kinetic energy of the battery 300 is preserved. Various further details of the battery assembly 300 are described in detail below. However, at this point in the disclosure, other aspects of the systems and methods of the disclosure will be described.

Figure 3:
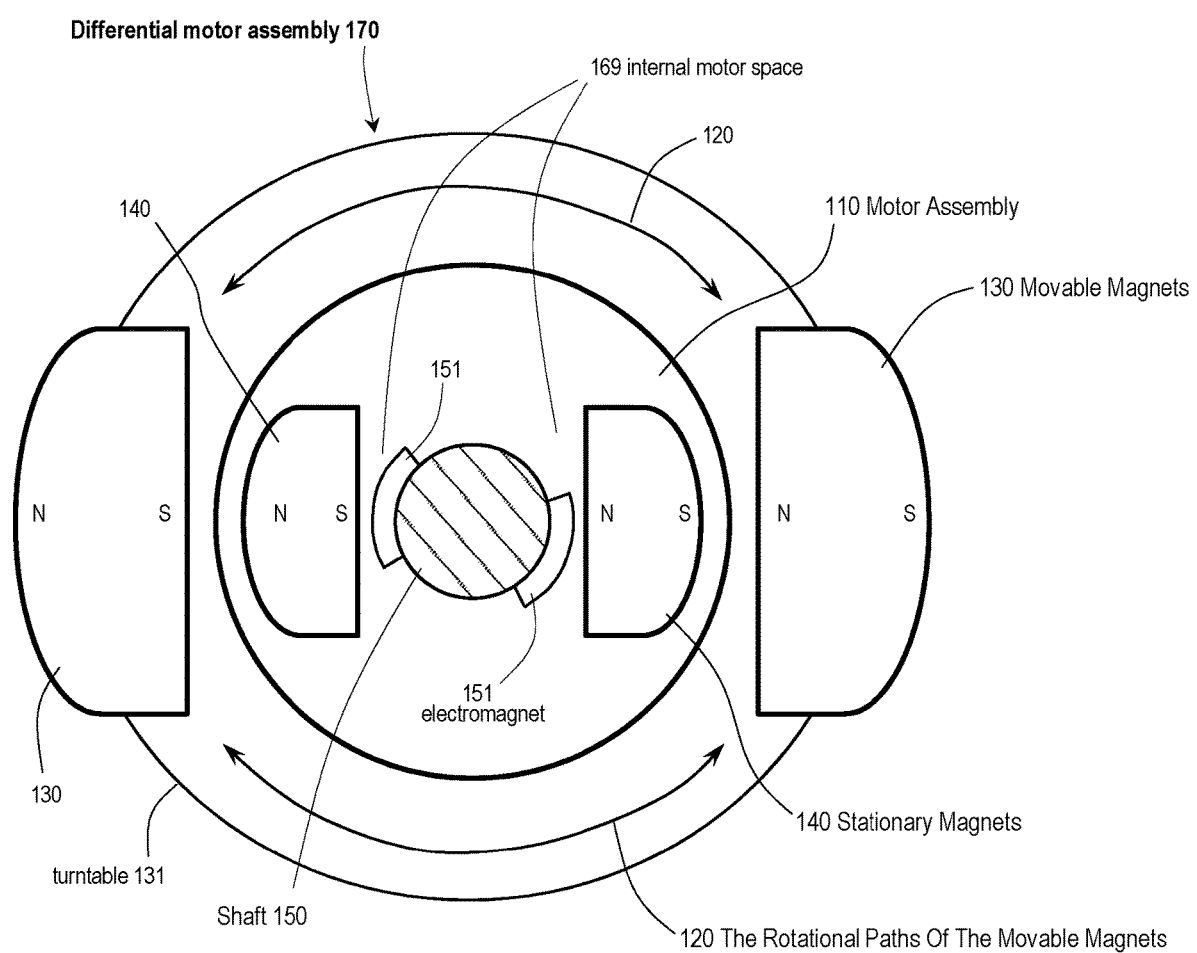
FIG. 3 is a schematic diagram that illustrates one example of a differential motor assembly, in accordance with at least one embodiment of the disclosure.

FIG. 3 is a schematic diagram of one example of a "differential motor assembly" 170, in accordance with at least one embodiment of the disclosure. The differential motor assembly 170 can be used in a battery assembly of the disclosure as described below.

The differential motor assembly 170 includes stationary magnets 140 and a shaft output 150. The arrangement shown in FIG. 3 includes an electric dc motor (motor assembly 110), which is surrounded by movable magnets 130. The movable magnets 130 rotate, about a rotation path 120, around the motor on a turning system such as a turntable 131. This rotation of the magnets 130, i.e. change in position of the magnets 130, around the motor assembly 110 may either strengthen or weaken the motor 110's assembly's output wattage and input torque/speed as described below. This increasing and decreasing of wattage, dependent on the position of the movable magnets 130, is because of the increase or decrease of the motor assembly's magnetic fields, i.e. the magnetic fields that are experienced by (a) the DC motor and (b) the components of the DC motor including electromagnets 151 that are mounted on the shaft output, i.e. the output shaft, 150. Illustratively, the two farthest setups, i.e. the extremes, that can result due to the position of the magnet(s) are, respectively, shown in the diagrams of FIG. 4 and FIG. 5, as described below.

The two movable magnets 130 shown in FIG. 3 both have their north and south poles, respectively, facing the same way, and can be rotated around the central motor assembly 110 to shift the direction of the magnetic field produced thereby. This magnetic field of the movable magnets 130 can either increase or decrease the magnetic field of the two stationary magnets 140 which are inside of the motor assembly 110. This increase or decrease of the field, as noted above, respectively strengthens or weakens the output wattage and input torque/speed of the motor assembly 110, and in particular strengthens or weakens the magnetic field experienced by the electromagnet 151 of the motor assembly 110, which is attached to shaft 150. Various details, such as motor brushes, brush pads, etc. are not shown in FIG. 3 for clarity.

Figure 4:
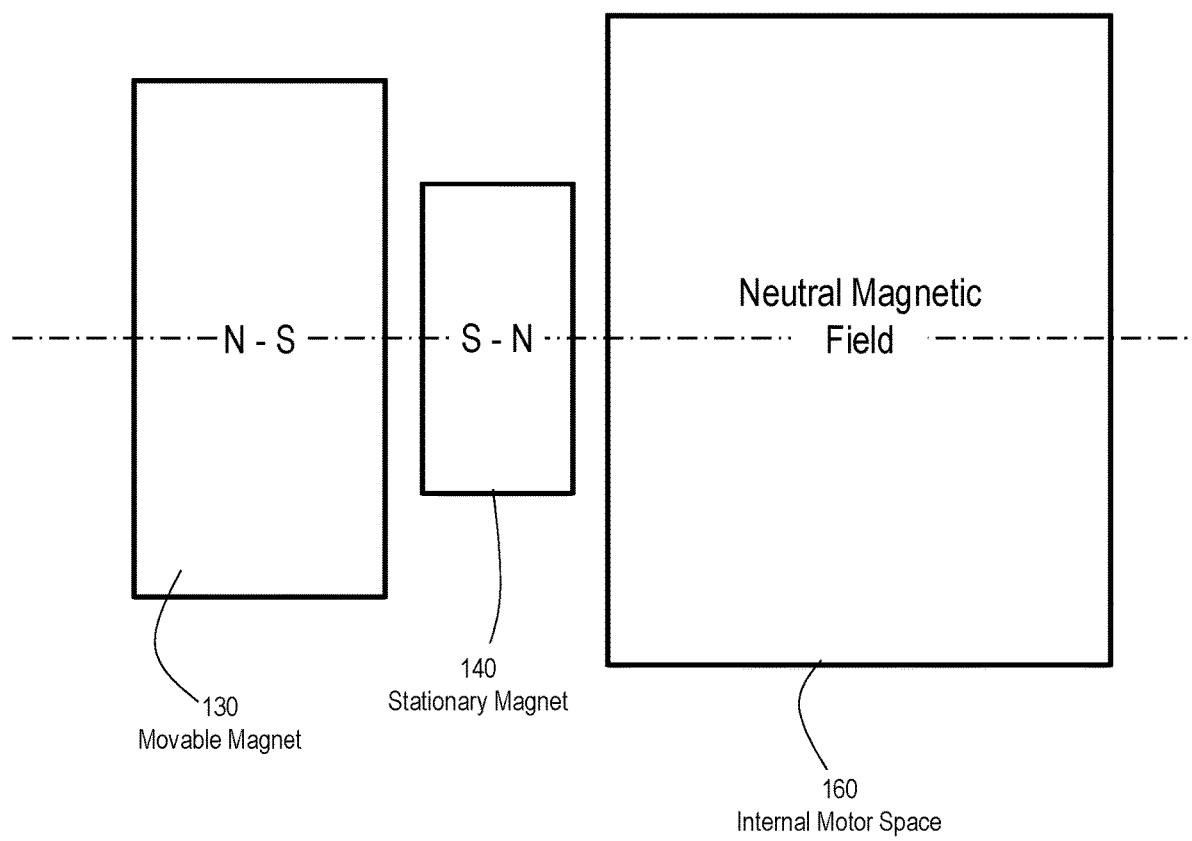
FIG. 4 is a schematic diagram that illustrates how the position of stationary magnets 140 and movable magnets 130 can be aligned, in accordance with at least one embodiment of the disclosure.

FIG. 4 is a diagram that illustrates how the position of stationary magnets 140 and movable magnets 130 can be aligned from a line drawn out from the center of the motor assembly 170, to have their poles be opposite in direction to each other, in accordance with at least one embodiment of the disclosure. This opposition of the poles of the stationary magnets 140 and the movable magnets 130 makes it possible to create an area where there is no magnetic field, i.e. so as to provide a neutral magnetic field inside of the internal motor space 160. Magnet 130 can be provided to be bigger than magnet 140 so as to compensate for the distance differential vis-à-vis the internal space of the motor assembly 110.

This absence of a magnetic field inside of the motor assembly 110 brings down the resistance of the motor as experienced by the electromagnets 151 (of the motor assembly 110) attached to the output shaft 150 fighting the stationary magnets 140 and the movable magnets 130 to almost nothing, if not nothing, and allows the motor to free spin. This free spinning, or close to free spinning, of the motor allows the system to maintain a storage of electricity or energy, in the form of kinetic energy, for a longer period of time without giving off a charge, i.e. in the situation when there is no need or desire for a charge to be output from the assembly. In other words, the movable magnets 130 effectively cancel out the force that the stationary magnets 140 exert on the electromagnets 151, which are attached to the shaft output 150, in the interior of the motor assembly 110. This allows a free spinning, or close to free spinning, scenario.

One can also rotate the position of the movable magnet 130 to a position near the stationary magnet, but not aligned, to have a wattage output less than that of the motor assembly alone, i.e. less than the output of the motor if the movable magnets 130 were not present, i.e. in tan arrangement of the differential motor assembly 170 being attached to a flywheel. This then allows the system to slowly use stored power for a prolonged period of time which is longer than the normal time of the differential motor assembly 170 being simply affixed to a flywheel, without the movable magnets 130. In other words, while FIGS. 4 and 5 show the extremes or respective ends of the spectrum, innumerable interim states may be provided in which the movable magnets 130 partially cancel out the stationary magnets 140.

Figure 5:
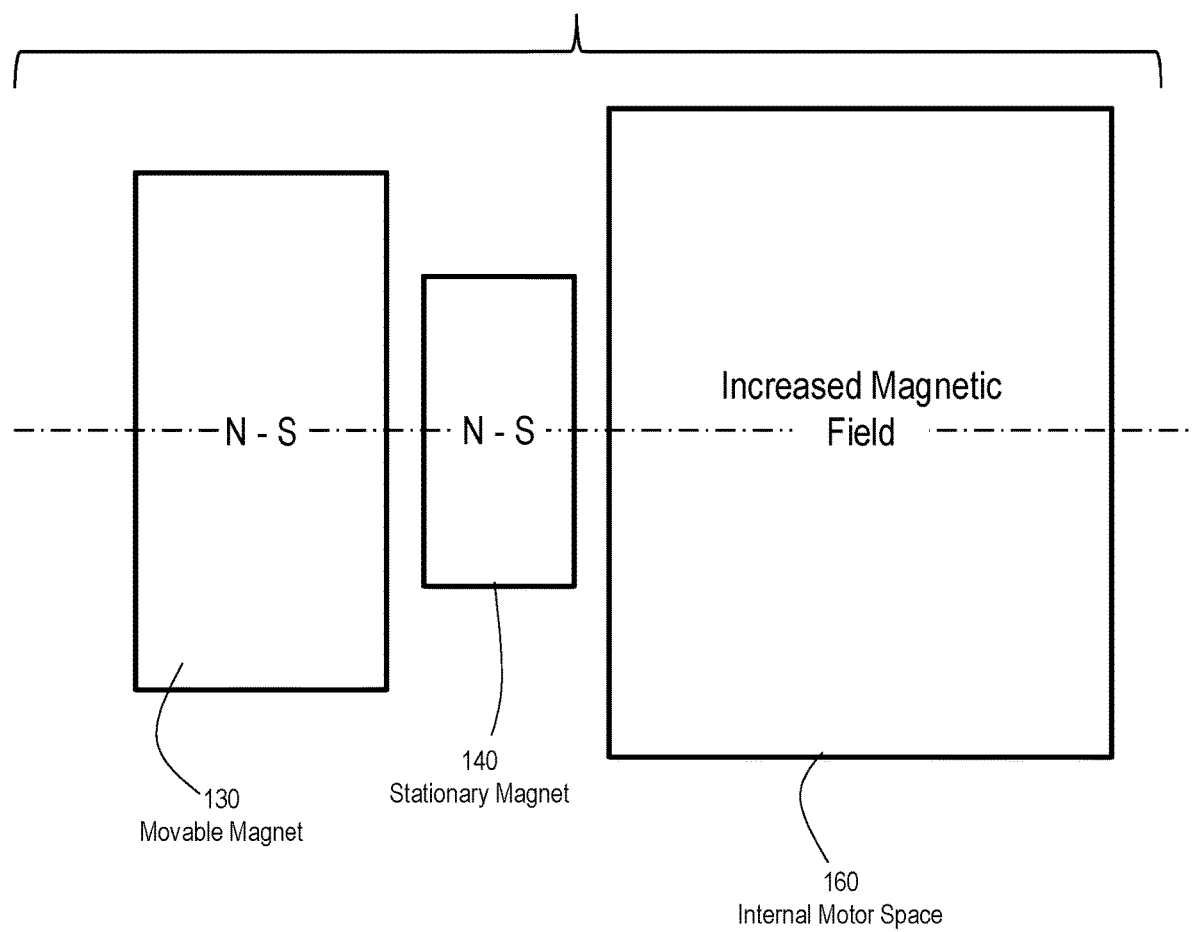
FIG. 5 is a schematic diagram that illustrates how the position of the stationary magnets 140 and movable magnets 130 can be aligned, in accordance with at least one embodiment of the disclosure.

FIG. 5 is a diagram that illustrates how the position of the stationary magnets 140 and movable magnets 130 can be aligned from a line drawn out from the center of the motor assembly, for example, to have their poles be identical or correspond in direction to each other, in accordance with at least one embodiment of the disclosure. This similar or same direction of the poles makes it possible to create an internal motor space 160 where there is a stronger magnetic field of a specific pole. This strengthening of a magnetic pole inside of the motor can increase the resistance of the motors internal electromagnets 151 to nearly double, for example, in accord with one example of the disclosure, i.e. with the alternative being that the movable magnets and the stationary magnets cancel out the internal space's magnetic field when the movable magnets 130 are shifted or rotated 180 degrees. The alignment, as shown in FIG. 5 of the poles of the movable magnets and the stationary magnets allows the motor to output a higher wattage than the motor assembly would otherwise export without the movable magnets 130.

Accordingly, the arrangement of FIG. 3, in manner as further described below, allows (a) the kinetic energy of the differential motor assembly 170 to be used quickly (i.e. converted to electrical energy) when needed (FIG. 5), or alternatively (b) allows the kinetic energy of the differential motor assembly 170 to be maintained hand-in-hand with outputting no or minimal electrical energy (FIG. 4). Accordingly, the arrangement allows the system to maintain electricity for a period of time, without needing to expend charge where there is no need to expend charge.

In accordance with the disclosed subject matter, one can also rotate the alignment of the movable magnet to a position near the stationary magnet, but not aligned, to have a wattage output to be greater than that of the motor alone but less than that of the movable magnets and the stationary magnets combined. This then allows the system to quickly use the stored power (for a shorter period of time), with such shorter period of time being quicker than the normal time of the motor being simply affixed to a flywheel, for example, by gears or a shaft. This output ratio of the movable magnet being nearly aligned with the stationary magnet to increase the magnetic field, will be determined by how much influence the movable magnets 130 and the stationary magnets 140 have on the electromagnets 151 in the interior of the motor assembly 110. This increased magnetic field can allow the motor to take in high wattage electricity and store such energy at a faster rate than the motor assembly 110 expends energy, i.e. such expension or expending of energy being when the movable magnets 130 and the stationary magnets 140 are not aligned to increase their magnetic strength.

Figure 6:
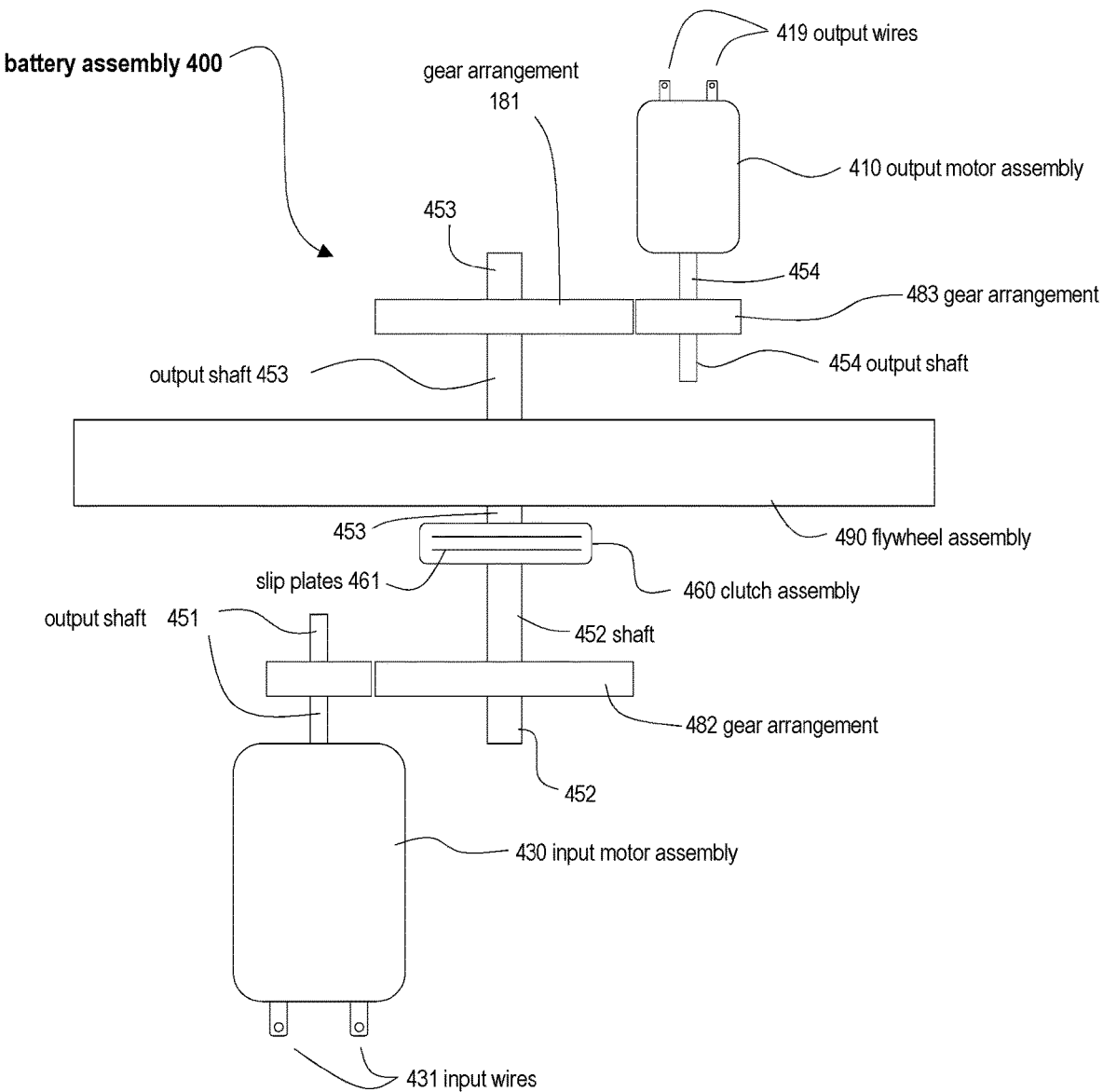
FIG. 6 is a schematic diagram that illustrates a dual motor assembly, in accordance with at least one embodiment of the disclosure.

FIG. 6 illustrates a battery assembly 400 that can achieve the goals or objectives as described above with reference to the differential motor assembly 170 of FIG. 3. The battery assembly 400 can incorporate the differential motor assembly 170 of FIG. 3 including movable magnets 130. Such goals or objectives can include inputting power to the battery assembly 400 at a higher wattage than the export of power from the battery assembly 400. Accordingly, the battery assembly 400 provides for decreasing an amount of time the assembly takes to charge the battery assembly 400, with such battery assembly 400 then being able to output energy for a prolonged period of time as desired, in accordance with at least one embodiment of the disclosure. FIG. 6 shows an example arrangement that can use the differential motor assembly 170 (of FIG. 3) as the generating motor or output motor assembly 410, in conjunction with a second motor assembly 430, i.e. input motor assembly 430 being a power-up motor.

In accordance with at least one embodiment of the disclosed subject matter, in operation of the arrangement of FIG. 4, the input motor assembly 430 is first energized, via electrical energy flowing in via wires 431, so as to rotate—and in particular so as to rotate shaft 451 of FIG. 4. Energy, i.e. rotation, is then transferred through a gear arrangement 482 to a shaft 452, and through a clutch assembly 460 to a shaft 453. The shaft 453 is connected or fixed to a weighted flywheel assembly 490 or flywheel 490, and accordingly, the rotation of the shaft 453 speeds up the weighted flywheel assembly 490.

As shown in FIG. 4, a second gear or sprocket ratio or arrangement 483 is then used to transfer the flywheel 190's energy to an output motor assembly 410, which acts as a generator to output electricity via wires 419. That is, the output motor 410 is akin to the motor 110 of FIG. 3 and can be of similar arrangement to the motor 110 of FIG. 3.

In accordance with at least one embodiment of the disclosed subject matter, the clutch assembly 460 allows the input motor 430 to turn the shaft 451, to turn the shaft 452 via gear arrangement 482, to turn the shaft 453 via clutch 431, and ultimately to turn the weighted flywheel assembly 190, but not for the shaft 453 (and the weighted flywheel assembly 490) to turn the input motor assembly 430. That is, the clutch assembly 460 can be a one-way clutch. Such arrangement allows the input motor assembly 430 to be effectively "disconnected" from the flywheel 490 during operation of the output motor 410 in a connected state with the flywheel 490. For example, the clutch 460 can include slip plates 461 that are controlled to engage or disengage so as to provide transfer of power or not provide transfer of power, respectively, as desired.

The gear or sprocket arrangements 482 allows the motor 430 to speed the flywheel 490 up to a higher rotation speed, than that of the motor 430, by using an unbalanced gear ratio, i.e. not a 1:1 gear ratio. For example, a 1:4 gear ratio might be used or any other gear ratio as may be desired—so as to speed up the flywheel and provide the kinetic energy that will be dispersed, as needed or desired, by the output motor 410. It is appreciated that the output motor 410 will (after all kinetic energy and at least some lost energy due to friction etc. is dispersed by the output motor 410) generate less energy than was imputed into the battery assembly 400. However, the output motor assembly 410 can disperse stored energy at a controlled rate as desired. Accordingly, the battery assembly 400 can output energy at lower wattage than the wattage at which energy was put into the system and do so at a controlled rate.

Figure 7:
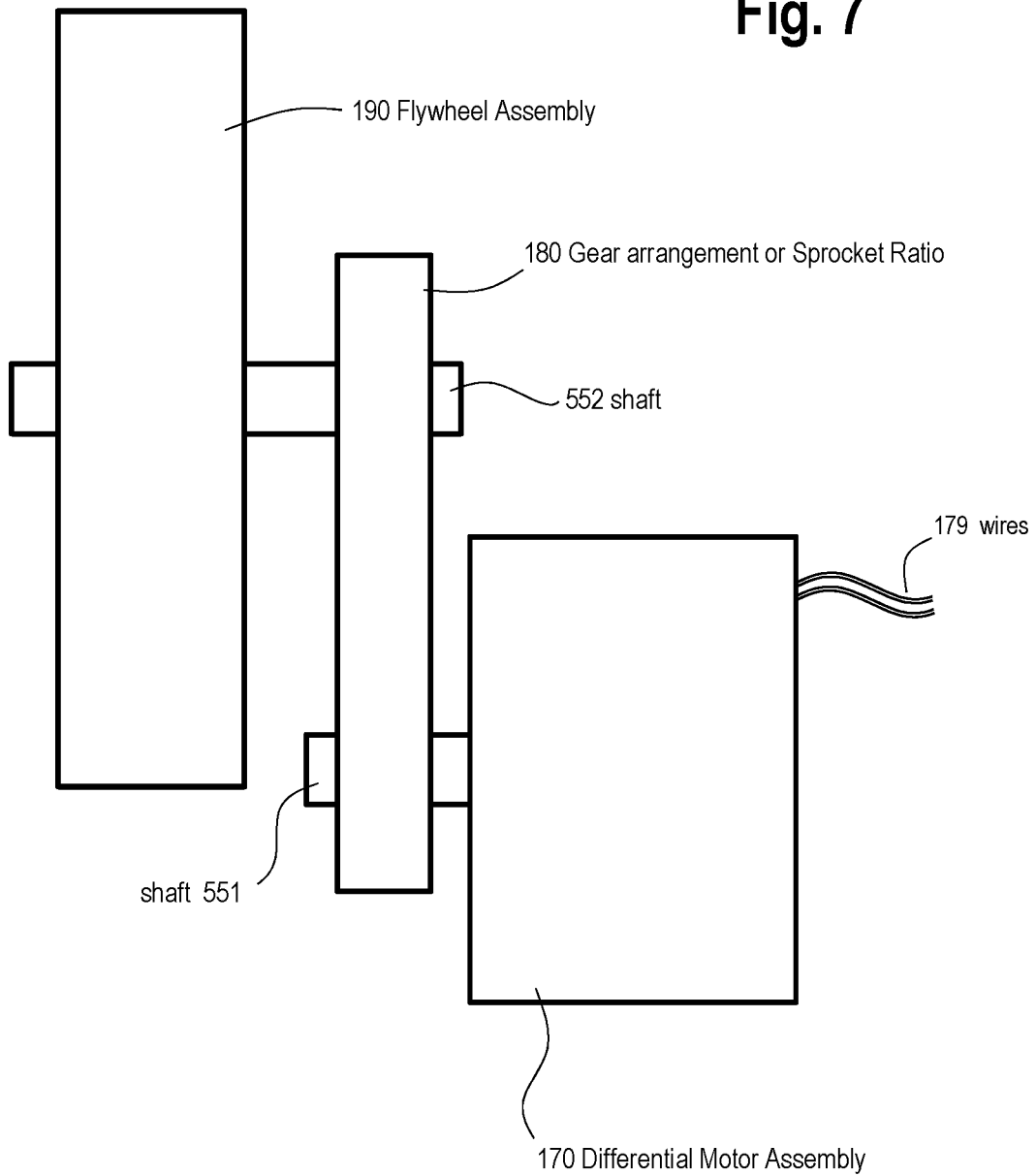
FIG. 7 is a schematic diagram that shows a single motor assembly, in accordance with at least one embodiment of the disclosure.

FIG. 7 shows a battery assembly 500 that utilizes the differential motor assembly 170 shown in FIG. 3 in accordance with at least one embodiment of the disclosure. As described further below, the differential motor assembly 170 can transform high wattage input electricity to low watt output energy that is dispersed as desired, in accordance with at least one embodiment of the disclosure. In particular, the differential motor assembly 170 of the disclosure allows electricity to be output, with wattage as desired as dependent on position of the movable magnets 130. The electricity can be output, from the differential motor assembly 170, via wires 179. That is, the differential motor assembly 170 functions as described in FIG. 3, while being geared through a gear ratio or gear arrangement 180 to a weighted flywheel assembly or flywheel 190.

In this example, the differential motor assembly (DMA) 170 is first energized via wires 179 so as to speed up the weighted flywheel assembly 190 through the shafts 551, 552. This speed up (and accumulation of kinetic energy) can be performed with the DMA 170 in its high magnetism state described in FIG. 5. A gear ratio or arrangement 180 may be used so as to increase the speed of the weighted flywheel assembly 190. In other words, the differential motor assembly 170 is initially used as a motor, driven by electric power from wires 179, so as to speed up the weighted flywheel assembly 190. The weighted flywheel assembly 190 is sped up until a desired RPM (revolutions per minute) is attained. This stores the electrical energy as mechanical energy, i.e. kinetic energy, in the weighted flywheel assembly 190.

Then the differential motor assembly 170 is switched to the "neutral magnetic field" state of FIG. 4. While the differential motor assembly 170 is in the "neutral magnetic field" state of FIG. 4 no energy is output from the differential motor assembly 170. The flywheel 190, gear arrangement 180 and differential motor assembly 170 can be allowed to spin in such "no energy is output" state.

At a later time and as desired, the differential motor assembly 170 is switched or transitioned toward or to the "increased magnetic field" state of FIG. 5 so that energy is output from the differential motor assembly 170. That is, as the weighted flywheel assembly 190 turns the differential motor assembly 170, through the gear ratio 180, while the differential motor assembly 170 is in an "increased magnetic field" state of FIG. 5, energy is output from the differential motor assembly 170. That is, electrical output is generated and output via wires 179. The electrical output can be used to power a device as desired. A variable generator is thus provided by the differential motor assembly 170.

One can dictate what wattage value comes off the differential motor assembly 170 by where the movable magnets 130 are placed in the differential motor assembly 170 relative to the stationary magnets 140. By having the magnets 130, 140 in the neutral position, described in FIG. 4, one can achieve a free spin of the differential motor assembly 170 where the motor 110 does not produce any current. However, positions between the positions respectively shown in FIG. 4 and FIG. 5 can be used to create different outputs, and thus the output can be variable as desired. Such variable output can provide a lower output wattage than the wattage at which energy was initially imputed into the differential motor assembly 170, in accordance with an aspect of the disclosed subject matter.

Figure 8:
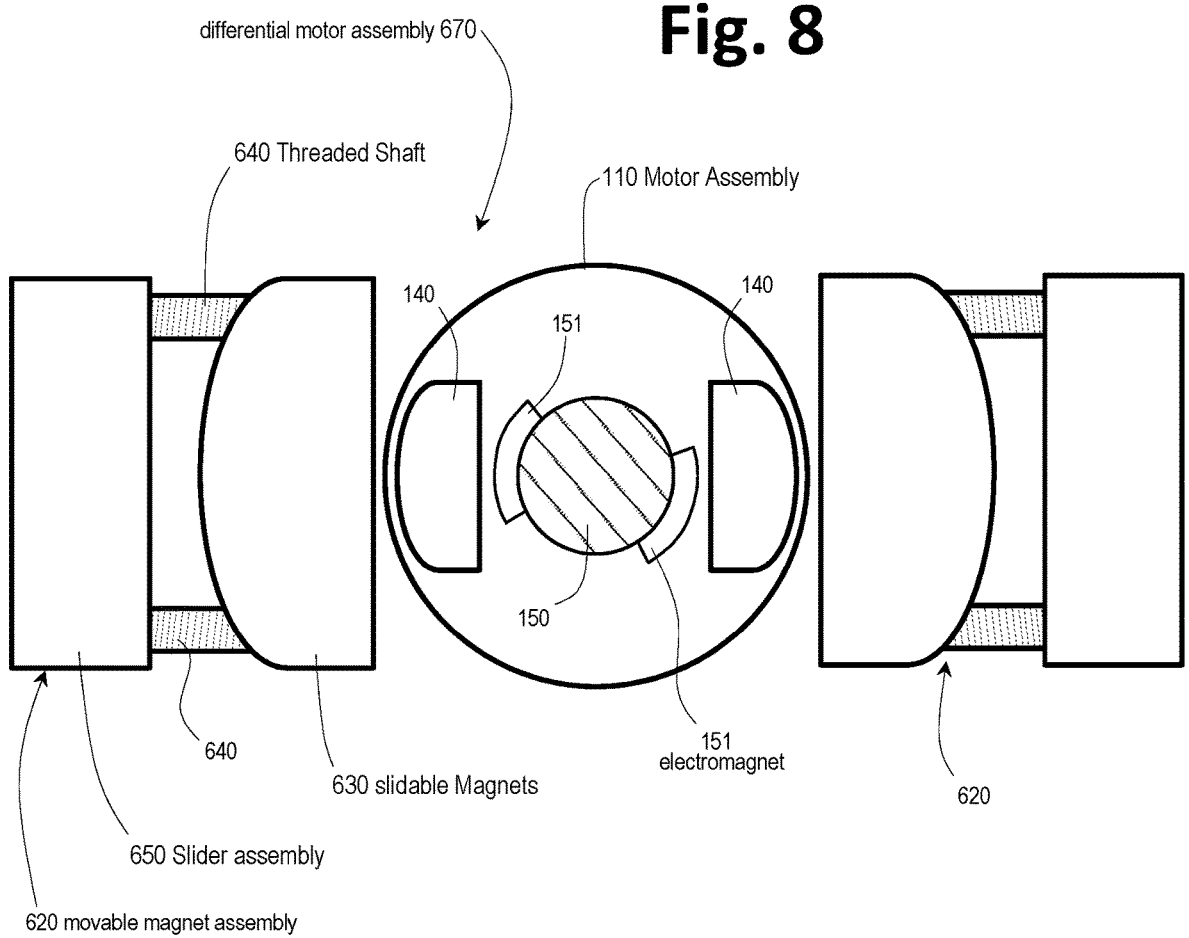
FIG. 8 is a schematic diagram that illustrates a fine adjustment system for the differential motor assembly, in accordance with at least one embodiment of the disclosure.

FIG. 8 is a schematic diagram of a differential motor assembly 670 that provides for fine adjustment of the differential motor assembly 670, in accordance with at least one embodiment of the disclosure. The arrangement includes one or more movable magnets 630 or, more accurately as to FIG. 8, slidable magnets 630 suspended or supported adjacent the motor assembly 110 by a movable magnet assembly 620. The movable magnet assembly 620 includes threaded shafts 640 as controlled by slider assembly 650 (or other adjustable mechanism), in accordance with at least one embodiment of the disclosure. The motor 110 can include an output shaft 150, stationary magnets 140, and electromagnet 151 (of the motor 110) the same as or similar to that shown in the motor assembly 110 of FIG. 3. A movable magnet assembly 620 may be provided on both sides of the motor assembly 110, as shown in FIG. 8.

With such an arrangement of the differential motor assembly 670 as shown in FIG. 8, a capability is provided to space the slidable magnet(s) 630 away from the motor assembly 110 at varying distances as desired. With this adjustment, functionality is provided to vary an amount that the slidable magnets 630 "cancel" out (or do not cancel out) the stationary magnets 140, i.e. so as to vary a magnetic field that is experienced by the electromagnets 151, as shown in FIG. 3.

In other words, this variation in position of the slidable magnets 630 variably cancels out the magnetic influence exerted by the stationary magnets 140 (of the motor assembly 110) on to the electromagnets 151 inside the motor assembly 110. In other words, the position of the slidable magnets 630, vis-à-vis the stationary magnets 140, changes the aggregated or additive EMF force inside the motor assembly 110 that is experienced by the electromagnets 151.

Accordingly, the slidable magnets 630, once moved close enough to the stationary magnets 140, can cancel out, or minimize, the magnetic influence exerted by the stationary magnets 140 upon the electromagnets 151.

Accordingly, and in further description of the concepts described above, it is appreciated that when the poles of the two magnet sets (the slidable magnets 630 and the stationary magnets 140 in FIG. 1) face different directions and are in close proximity to each other, such arrangement can completely or substantially cancel out the magnetic field inside the motor 110, as experienced by the electromagnet 151. On the other hand, it is appreciated that when the poles of the two magnet sets (the slidable magnets 630 and the stationary magnets 140 in FIG. 1) face same directions and are in close proximity to each other, such arrangement can double or substantially double the magnetic field inside the motor 110, as experienced by the electromagnets 151.

Accordingly, FIG. 8 illustrates a variation to the differential motor assembly 170 shown in FIG. 3, in accordance with at least one embodiment of the disclosure. The arrangement of FIG. 8 cancels out the magnetic influence, inside the motor assembly 110, of both slidable magnets 630 and stationary magnets 140 once the slidable magnets 630 come closer to the stationary magnets 140. However although you can have a system like the one shown in FIG. 8, you can also have a system that only has the slidable magnets 630, in which the slidable magnets would come into the motor and provide all of the magnetism for the system rather than having two magnets cancel out as seen in FIG. 8. As shown in FIG. 8, the threaded shafts 640 are capable of rotation which either causes the slidable magnets 630 to approach or retract from the motor assembly 110. These threaded shafts 640 work in the same manner even if the stationary magnets are removed from the system and this assembly just has the slidable magnets approach the motor assembly 110 and retract from the motor assembly 110 in order to increase or decrease the resistance of the electromagnets 151 inside the motor assembly 110. This increase or decrease of the resistance, i.e. EMF force, shown by the electromagnets inside the motor assembly 110 either increases or decreases the output wattage when the motor assembly 110 is spinning and is generating current. The threaded shafts 640 allow approaching or retracting of the slidable magnets 630 to be controlled and precise.

Figure 9:
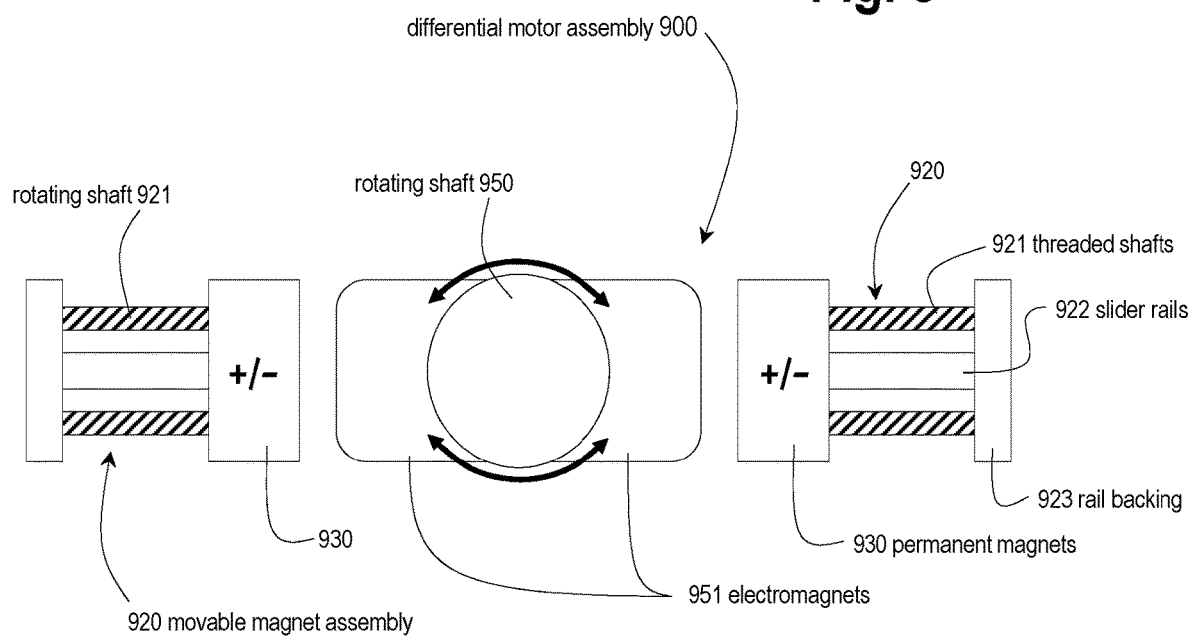
FIG. 9 is a schematic diagram that illustrates a further fine adjustment system for the differential motor assembly, in accordance with at least one embodiment of the disclosure.

In further illustration, FIG. 9 is a schematic diagram of a further differential motor assembly 900, in accordance with at least one embodiment of the disclosure. As described above with reference to FIG. 8, FIG. 9 illustrates an arrangement in which only one set of permanent magnets are provided. This is in contrast to the arrangement of FIG. 3 that includes both the stationary magnets 140, being a part of the motor assembly 110, and the movable magnets 130. In other words, FIG. 9 might be characterized as not including the stationary magnets 140 of FIG. 3.

Accordingly, FIG. 9 provides a system that has the slidable magnets 930 that can be constituted by permanent magnets. The slidable magnets 930 come in close to the electromagnets 951 and provide magnetism for the system, applied to the electromagnets 951, i.e. rather than having two magnets cancel out as seen in FIG. 8 or in FIG. 3.

Figure 10:
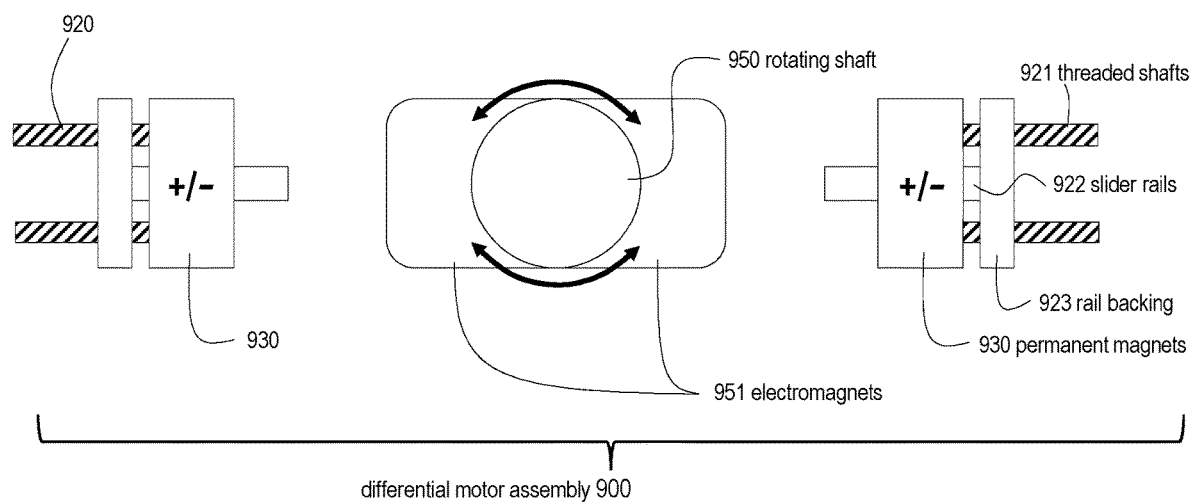
FIG. 10 is a schematic diagram that illustrates the fine adjustment system of FIG. 9 for the differential motor assembly, in accordance with at least one embodiment of the disclosure.

As shown in FIG. 9, movable magnet assemblies 920 are provided on both sides of the electromagnets 951. The movable magnet assemblies 920 each include permanent magnets 930 that are mounted on threaded shafts 921. Each movable magnet assembly 920 may include a rail backing 923. The rail backing 923 provides corresponding threaded apertures to interface with a corresponding rotating shaft 921. For example, the rail backing 923 can include a motorized collar that can be controlled by a suitable control system. As a result, the threaded shafts 921 can be engaged with so as to be threaded in an outboard direction of the electromagnets 951 (and the rotating shaft 950). Accordingly, the permanent magnets 930 can be pulled away from the electromagnets 951. FIG. 10 illustrates the permanent magnets 930 in such a retracted position. Accordingly, the distance of the permanent magnets 930 from the electromagnets 951 is variable. This variability provides adjustment to the EMF experience that is experienced by the electromagnets 951. Relatedly, the rotating shaft 950 can be connected to an energy storage device such as a flywheel. This connection to an energy storage device may utilize known mechanical linkages, such as a gear arrangement.

In other words, the threaded shafts 921 are capable of rotation which either causes the slidable magnets 930 to approach or retract from the motor assembly 900. Slide rails 922 can be implemented into the system as seen in this assembly to further control the path of the slidable magnets 930 as they are pushed towards and from the motor assembly 900, by the threaded shafts 921. For example, each of the slider rails 922 may be in the form of a rail that engages with a track in the rail backing 923. The slider rails 922 can be provided to maintain desired orientation of the permanent magnets 930.

Figure 11:
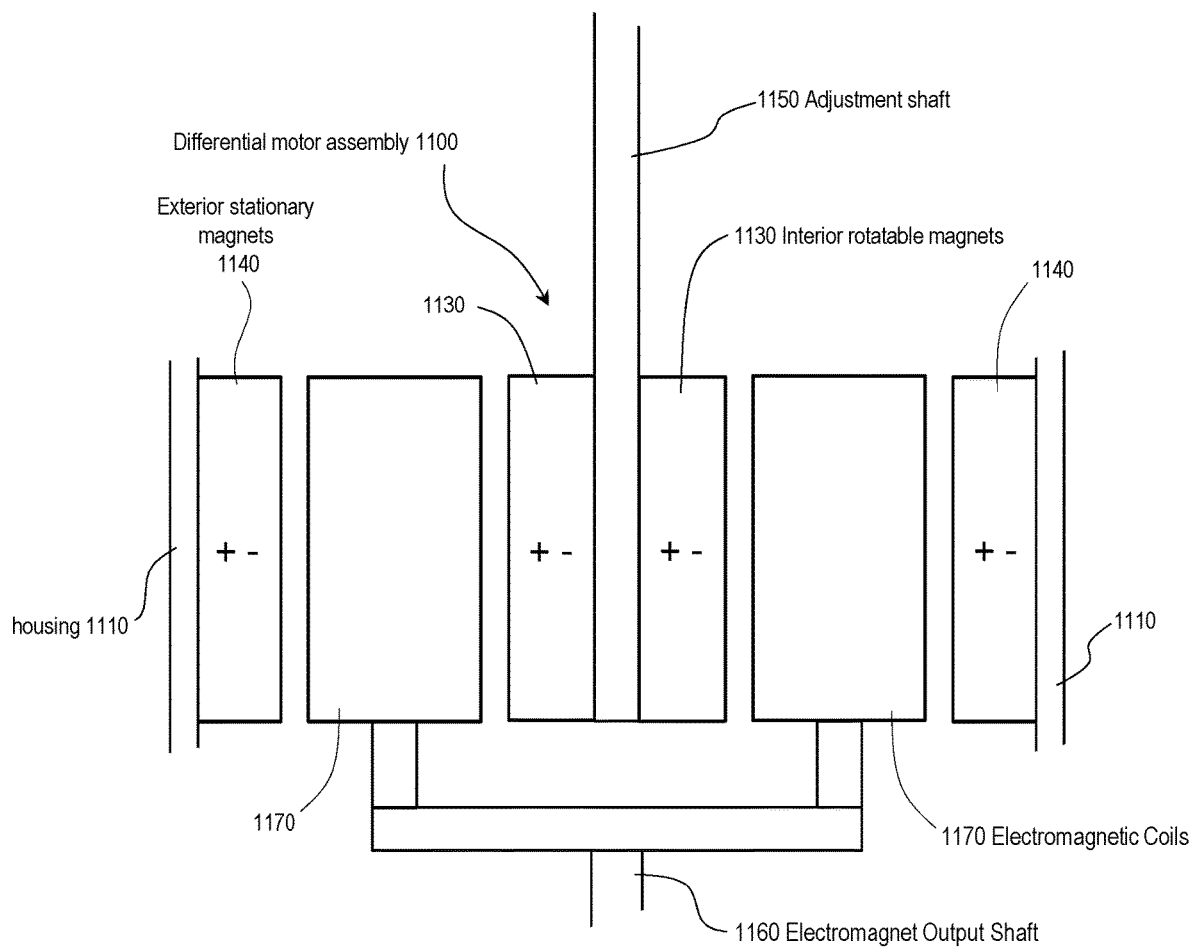
FIG. 11 is a schematic diagram that illustrates a further differential motor assembly, in accordance with at least one embodiment of the disclosure.

FIG. 11 is a schematic diagram illustrating a further version of a differential motor assembly 1100 that has two sets of permanent magnets on either side of electromagnetic coils 1170, instead of just on one side, in accordance with at least one embodiment of the disclosure. As shown, such permanent magnets include the exterior stationary magnets 1140 and the interior movable magnets 1130.

By having the permanent magnets on either side of the electromagnetic coils 1170, one may be able to utilize smaller magnets for such permanent magnets—since the rotatable magnets 1130 are positioned at the same distance from the electromagnetic coils 1170 as the exterior stationary magnets 1140. In contrast, note the arrangement of FIGS. 4 and 5 in which the movable magnets 130 are larger as compared to the stationary magnets 140.

In the arrangement of FIG. 11, rotatable magnets 1130 are provided on the inside and exterior stationary magnets 1140 are provided on the outside (of the electromagnetic coils 1170). In an alternative arrangement, one can also build a system with the rotatable magnets on the outside and the stationary magnets on the inside (of the electromagnetic coils 1170).

Having the permanent magnets 1130, 1140 on either side of the electromagnetic coils can allow for higher efficiency of the differential motor assembly 1100 where a larger portion of the electromagnetic field generated is utilized. This particular assembly, as shown in FIG. 11, can work by supplying power (i.e. electrical power) to the electromagnetic coils 1170 which fight (magnetically) against the permanent magnets 1130, 1140 and power the electromagnetic output shaft 1160 so as to rotate. The electromagnetic output shaft 1160 may be connected to a rotating flywheel to store energy, i.e. in the form of kinetic energy, in the rotating flywheel.

The exterior stationary magnets 1140 can be affixed to a supporting housing 1110. The rotatable magnets 1130, positioned in the center of the differential motor assembly, 1100 can be rotated by rotation of a connected adjustment shaft 1150, to either (a) match or (b) not match, the corresponding stationary magnets 1140 on the other side of each electromagnet 1170, or more specifically on the other side of the circular, rotational path of the electromagnet coils 1170. By having the poles of both magnets 1140, 1130 match up (across the rotational path of the electromagnet coils 1170) with each other, an arrangement is created where a strong magnetic field is created, in similar fashion to FIG. 5. Whereas when you have the poles of the magnets 1130, 1140 oppose each other, you diminish or zero out the electromagnetic field in a similar fashion to FIG. 4. This diminish or increase of the electromagnetic field, as experienced by the electromagnet coils 170, respectively, increases or decreases the power output of the motor as well as its ability to generate electricity. The rotatable magnets 1130 can be varied in position vis-à-vis the poles of the exterior stationary magnets 1140 anywhere between (a) poles of the magnets 1130 and 1140 being fully opposed to each other—so as to cancel each other out as experienced by the electromagnet coils 1170, and (b) poles of the magnets 1130 and 1140 being fully aligned to each other—so as to be additive to each other, as experienced by the electromagnet coils 1170. As a result, a variable, transmission like system is provided that enables the differential motor assembly 1100 to output any wattage level between their maximum and their minimum.

Hereinafter, further aspects of the battery 300 of FIG. 1 will be described, in accordance with at least one embodiment of the disclosure.

As described above, FIG. 1 is a diagram of a battery assembly 300, in accordance with at least one embodiment of the disclosure. The battery assembly 300 includes a flywheel assembly 310. The flywheel assembly 310 includes electromagnet 320 and electromagnet 330. The flywheel assembly 310, along with the electromagnets 320, 330, rotate or spin. It is this rotation, or movement 391 as illustrated in FIG. 1, of the flywheel assembly 310, that constitutes stored kinetic energy of the battery assembly 300. As the flywheel assembly 310 rotates or spins faster, such increased rotation speed constitutes more stored energy. As shown in FIG. 1 as described above, electromagnets are mounted on the flywheel assembly 310. Such electromagnets variably interact with one or more respective permanent magnets. This interaction can result in the battery 300 not outputting electrical energy, as shown in the arrangement of FIG. 1. Alternatively, this interaction can result in the battery 300 outputting electrical energy, as shown in the arrangement of FIG. 2. If the battery 300 does not output electrical energy, the battery can maintain a state of free spin (absent minimal frictional forces) and in such state of free spin the kinetic energy of the battery 300 is preserved. Various further details of the battery assembly 300 are described in detail below. However, at this point in the disclosure, other aspects of the systems and methods of the disclosure will be described.

The battery 300 further includes a static magnet plate 340 and an adjustable magnet plate 350. The static magnet plate 340 includes a permanent magnet 342. The adjustable magnet plate 350 includes permanent magnet 352. The adjustable magnet plate 350 can be adjusted so as to vary a position of the permanent magnet 352 relative to the permanent magnet 342. Such variability is illustrated in the position 352P1 of the permanent magnet 352 as shown in FIG. 1 as compared to the position 352P2 of the permanent magnet 352 as shown in FIG. 2 (and as shown in phantom in FIG. 1).

In the arrangement of FIG. 1, with the particular position 352P, as the electro magnet 330 approaches the permanent magnet 352, the electromagnet 330 experiences an ongoing change in EMF as the electromagnet 330 draws closer to the permanent magnet 352, i.e. so as to provide different experienced EMF. This ongoing change in EMF drives a current flow from or of the electromagnet 330. Such current flow passes through wires 335, 336. Wires 335, 336 are connected to brush pad 371 and brush pad 372, respectively.

Additionally, as the electromagnet 320 approaches the permanent magnet 342, the electromagnet 320 experiences an ongoing change in EMF as the electromagnet 320 draws closer to the permanent magnet 342. This ongoing change in EMF drives a current flow from or of the electromagnet 320. Such current flow from the electromagnet 320 passes through wires 325, 326. Wires 325, 326 are connected to brush pad 371 and brush pad 372, respectively.

Electromagnet 320 can include coils 322. The coils 322 can be connected to wires 325, 326. Electromagnet 330 can include coils 332. The coils 332 can be connected to wires 335, 336. The wires 325, 326, 335, 336 may be connected to brush pad assembly 370. Brush pad assembly 370 is shown expanded at 393 in FIG. 1. More specifically, wire 335 and wire 325 can be connected to brush pad 371. Wire 326 and wire 336 can be connected to brush pad 372. As shown in the expanded view 393 of FIG. 1, brush pad 371 can be in the form of a half circle pad. Brush pad 372 can also be in the form of a half circle pad. Brush pad 371 can be mirrored image of brush pad 372 with gaps 375 separating the brush pad 371 from the brush pad 372.

The battery assembly 300 can also include brush assembly 381 and brush assembly 382. The brush assembly 381 can include a contact 383. The brush assembly 382 can include contact 384. The brush assemblies 381, 382 can pass through the adjustable magnet plate 350 in a manner as described below. As the brush pad assembly 370 rotates, along with the flywheel assembly 350 upon which the brush pad assembly 370 is supported, the contact 383 alternates between contacting brush pad 371 and brush pad 372, in conjunction with the contact 383 alternating between contacting the other of brush pad 372 and brush pad 371. Further details are described below.

In this illustrative arrangement of FIG. 1, the spacing between the electromagnet 320 vis-à-vis the permanent magnet 342 as compared to the spacing between the electromagnet 330 vis-à-vis the permanent magnet 352 is the same or nearly the same. Additionally, the construct of the electromagnet 320 is the same as the construct of the electromagnet 330, i.e. the electromagnets 320, 330 can be the same type of model of electromagnet.

However, of note, the polarity of the permanent magnet 342, to which the electromagnet 320 is exposed, i.e. approaching, is negative. On the other hand, the polarity of the permanent magnet 352, to which the electromagnet 320 is exposed, i.e. approaching, is positive. Accordingly, while both the electromagnet 320 and the electromagnet 330 experience current drives as a result of approaching the respective permanent magnets, the current drive experienced by the electromagnet 320 is in an opposite direction relative to the current drive experienced by the electromagnet 330. As a result, in this illustrative arrangement of FIG. 1, the two current drives balance each other resulting in a zero or nearly zero net current flow as observed in brush pad assembly 370. In other words, the current drive from the electromagnet 320 cancels out the current drive from the electromagnet 330. Such might be characterized as including an opposing flow of electrons that stall or cancel each other out—thus resulting in a "destructive interference" situation between the two current drives associated with the electromagnets 320, 330.

It is appreciated that the particular direction that the current flows, in the arrangement and disposition shown in FIG. 1, will depend on the particular structure of the electromagnets 320, 330 and the particular structure of the respective permanent magnets 342, 352, as dictated by the "right hand rule" of the current flow, in accordance with at least one embodiment of the disclosure. As described above, the two electromagnets 320, 330 are of the same construct. Accordingly, since the two electromagnets 320, 330 are of the same construct and experience the same EMF experience, except in reverse polarity from each other, each electromagnet 320, 330 can generate equal, but opposing, current. It is this situation that results in the 2 respective current flows from the electromagnets 320, 330 canceling each other out or in other words balancing each other. As noted above, the arrangement might be characterized as a situation of destructive interference between the two current drives.

Accordingly, in the disposition of the battery assembly 300 shown in FIG. 1, there is complete or nearly complete destructive interference between current flows from the electromagnet 320 and the electromagnet 330. That is, no energy is being pulled off or siphoned off as a result of the rotating electromagnets 320, 330 passing by the respective permanent magnets 342, 330. Since no energy or nearly no energy is being pulled off the battery assembly 300, then rotational speed of the flywheel assembly 310 is not diminished or is minimally diminished. In other words, conservation of energy dictates that if no electrical energy is flowing from the battery assembly 300 then energy of the battery, absent frictional forces from the rotation if any, should remain constant. Accordingly, the battery assembly 300, as shown in FIG. 1, provides an arrangement of stored energy with no current flow or minimal current flow. However, in the manner described further below and illustratively shown in FIG. 2, as the permanent magnet 352 is adjusted from the position shown in FIG. 1, there will indeed be an imbalance in EMF experienced by the electromagnet 330 as compared to the electromagnet 320. It is this imbalance in EMF experience between the 2 electromagnets that can provide a current flow. Furthermore, such current flow constitutes energy flowing out of the battery assembly 300. Accordingly, this energy flow results in a proportional decrease in RPM of the flywheel assembly 310. In other words, a portion of the kinetic energy stored in the rotating flywheel assembly 310 is converted to electrical energy flowing into the brush assemblies 381, 382.

It is appreciated that differences in structure of various components, of the various embodiments, described herein may influence of effect desired operation of a particular assembly. For example, similar structure of two components may operate slightly differently or differently due to variations in manufacturing.

FIG. 2 is a further schematic diagram of battery assembly 300, in accordance with at least one embodiment of the disclosure. However, as alluded to above, in FIG. 2 the position of the permanent magnet 352 has been changed from position 352P1 to position 352P2. As a result, the changing EMF environment experienced by the electromagnet 320 and the electromagnet 330, as a consequence of (a) the electromagnet 320 approaching the permanent magnet 342 and (b) the electromagnet 330 departing from the permanent magnet 330 (in the position 352P2), provides an additive current. That is, in the arrangement of FIG. 2, the two current drives are in the same direction so as to be additive to each other. Such a situation might be characterized as resulting in constructive interference between the two current drives.

Accordingly, it should be appreciated that the adjustability of the adjustable magnet plate 350 allows the position of the permanent magnet 352 to be adjusted, as desired, relative to the permanent magnet 342. As the permanent magnet 352 is so adjusted, the cumulative effect of the current drives from the electromagnet 320 and the electromagnet 330 will also vary.

In accordance with at least one embodiment of the disclosure, as the electromagnet 320 approaches the permanent magnet 342 so as to be underneath the permanent magnet 342 (and symmetrically positioned relative to the permanent magnet 342 along a vertical axis), variance in EMF (as experienced by the electromagnet in total) will progressively diminish in such approach. Indeed, at a point in the electromagnet 320 passing by the permanent magnet 342, current output from the electromagnet 320 will diminish in magnitude of a first polarity, attain a zero value at some point, and then increase in magnitude in the opposite polarity. In other words, as the electromagnet 320 passes by the permanent magnet 342, current from the electromagnet 320 will experience a switchover. This switchover, by design of the construct of the battery assembly 300, can be synchronized with the brush assemblies 381, 382 switching over brush pads 371, 372.

As a result of the synchronized switchover of the electromagnet 320 passing by the permanent magnet 342, output 383 from the battery can always be of the same particular polarity, as dependent on the construct of the electromagnet 320. For purposes of illustration, in this example and arrangement, let's say that the particular polarity is positive. That is, as the electromagnet 320 approaches the permanent magnet 342, the positive current flow from the output 383 will gradually decrease. The current flow will attain a 0 value hand in hand with (a) the electromagnet 320 being aligned vertically with the permanent magnet 342, and (b) switchover of the brush assemblies to the other brush pad. As the electromagnet 320 departs from the permanent magnet 342, the still positive current flow from the output 383 will then gradually increase as the electromagnet 320 parts from the permanent magnet 342.

However, while the electromagnet 320 possesses the capability to produce an ongoing positive polarity output, even though varying in magnitude, the electromagnet 330 will or will not cancel out such positive polarity (of the electromagnet 320) as dependent on the adjustable 392 position of the electromagnet 330. In the arrangement shown in FIG. 1, the electromagnet 330 fully cancels out the electromagnet 320. However, as the electromagnet 330 is adjusted 3922 the left as shown in FIG. 1, that cancellation will decrease in magnitude. Indeed, in the arrangement shown in FIG. 2, the current output by the electromagnet 330 (as a result of interaction with the permanent magnet 352) will be substantially additive or aggregated with or to the current output by the electromagnet 320 (as a result of interaction with the permanent magnet 342).

In an assembly with a brush pad including a plurality of brush pad contact surfaces, processing of an assembly of the disclosure is allowed to repeat—as a rotating assembly rotates and/or passes through a portion of the rotation.

The arrangement of FIG. 1 shows two electromagnets 320 and 330 provided in the flywheel assembly 310. In accordance with at least some embodiments of the disclosure, the flywheel assembly 310 can be provided with more electromagnets, as desired. Hand-in-hand, the adjustable magnet plate 350 and the static magnet plate 340 can be provided with additional permanent magnets that interact with the electromagnets. Illustrative examples of arrangements that can include the arrangement of FIG. 1 are FIG. 12 and FIG. 13.

Illustratively, an arrangement of the disclosure may be characterized as including a 1st tuning magnet and a 2nd tuning magnet. The 1st tuning magnet can be adjustable such as the lower permanent magnets in the arrangement of FIG. 13 and FIG. 14. The 1st tuning magnets can move to various positions as desired relative to a 2nd tuning magnet, i.e., the upper permanent magnets in the arrangement of FIG. 13. Accordingly, this movement may be characterized as the 1st tuning magnet positionable throughout a range of positions that include a 1st position and a 2nd position. It is this variance in position that can create a different EMF experience for electromagnets in the arrangement, such as the electromagnets shown in FIG. 13.

Figure 13:
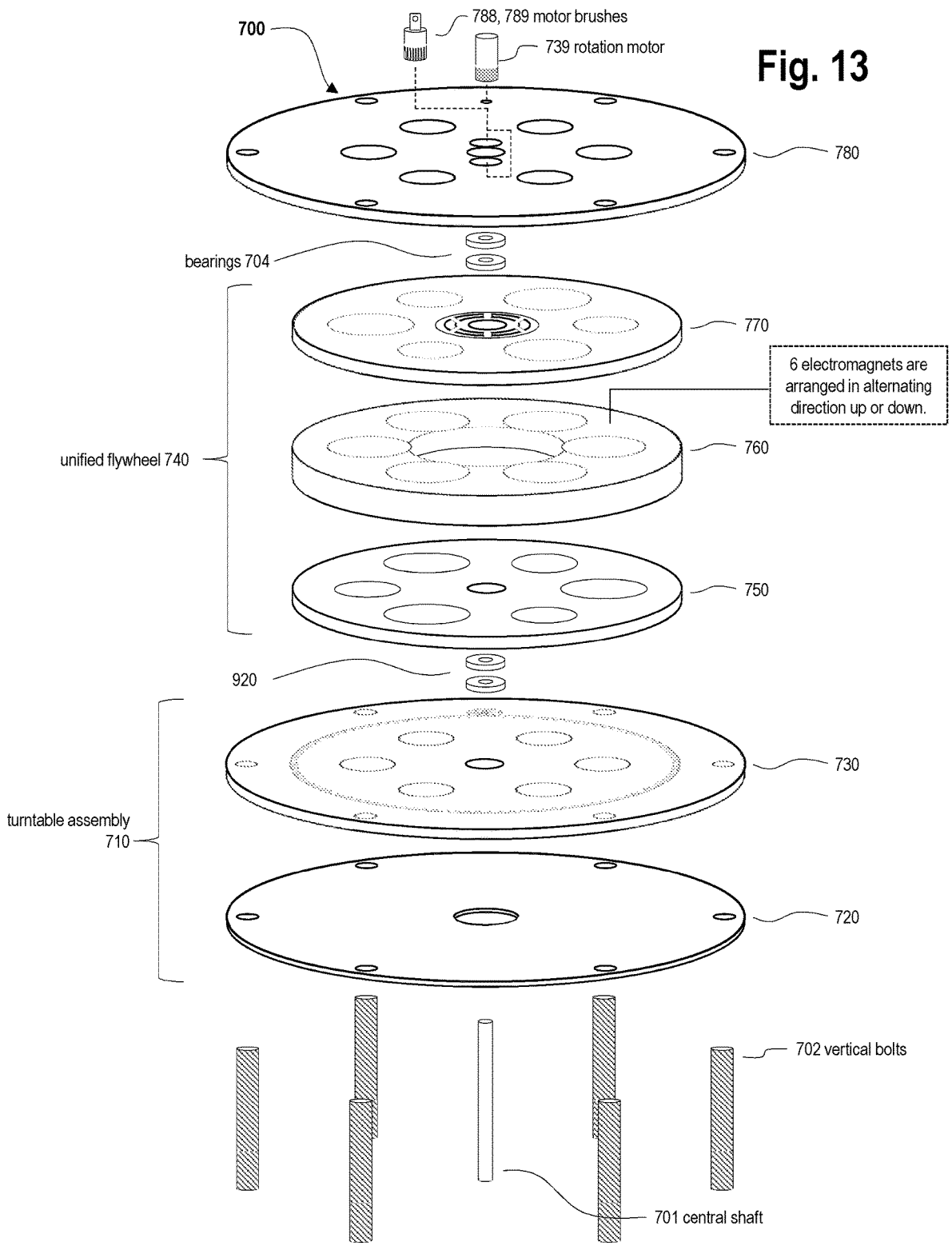
FIG. 13 is an exploded perspective view of a further differential motor assembly with a flywheel, in accordance with at least one embodiment of the disclosure.

As is the case in the arrangement of FIG. 13 and related figures, it is appreciated that particular electromagnets of an assembly may be aimed at or associated with permanent magnets that are intended to interact with electromagnets. Electromagnets of such an assembly may be aimed at or associated with other permanent magnets. Accordingly, particular electromagnets in an arrangement may, by construct of the arrangement, be dictated primarily by one or more permanent magnets. However, the invention is not limited to such construct. Relatedly, it is appreciated that directional electromagnets may be utilized in the systems and methods of the invention. Such directional electromagnets may be constructed so as to provide and/or interact with an electrical field and/or magnetic field in a particular direction. For example, this might be accomplished by the coils that make up the electromagnet being oriented in a particular direction, with a center core oriented in a particular direction, and/or provided with a housing that limits operation of the electromagnet in a particular direction. For example, the electromagnet might be provided with a steel or insulated backing.

Related to FIG. 1 described above, FIG. 12 illustrates a further differential motor assembly 1200, in accordance with at least one embodiment of the disclosure. The differential motor assembly 1200 utilizes multiple magnet plates (which include rotatable magnet plate 1210, stationary magnet plate 1230, and electromagnet plate 1220). The rotatable magnet plate 1210 may be rotatably mounted on a bearing 1250 on the shaft 1241, supported and rotated by a turn device 1260, such as a motor driven friction wheel. All of plates 1210, 1220, 1230 can be secured to shaft 1241 so as to prevent axial movement along shaft 1241. The stationary magnet plate 1230 can be attached to a housing 1291. The shaft 1241 can be rotatably secured in a housing 1291 and can be attached to flywheel, although the electromagnet plate 1220 in and of itself can possess mass so as to store kinetic energy.

The stationary magnet plate 1230 holds stationary magnets 1231. The rotatable magnet plate 1210 holds rotatable magnets 1211. The rotatable magnet plate 1210 can be rotated relative to the stationary magnet plate 1230 so as to change the magnetic field experienced by electromagnets, i.e. electromagnet coils 1221, which are mounted in the electromagnetic plate 1220.

The rotatable magnet plate 1210 can be rotated around the output shaft 1241 so as to either align the rotatable magnets 1211 with or against the stationary magnets 1231 on the stationary magnet plate 1230. By having the rotatable magnets 1211 and the stationary magnets 1231 align their poles, you create a low magnetic field resistance that allows the electromagnet coils 1221 to generate less current. However, you can also have the rotatable magnets 1211 and the stationary magnets 1231 align with their poles reversed to each other—to generate a high magnetic field resistance which will force the electromagnets 1221 to generate more current when the electromagnets 1221 are rotated.

Figure 12:
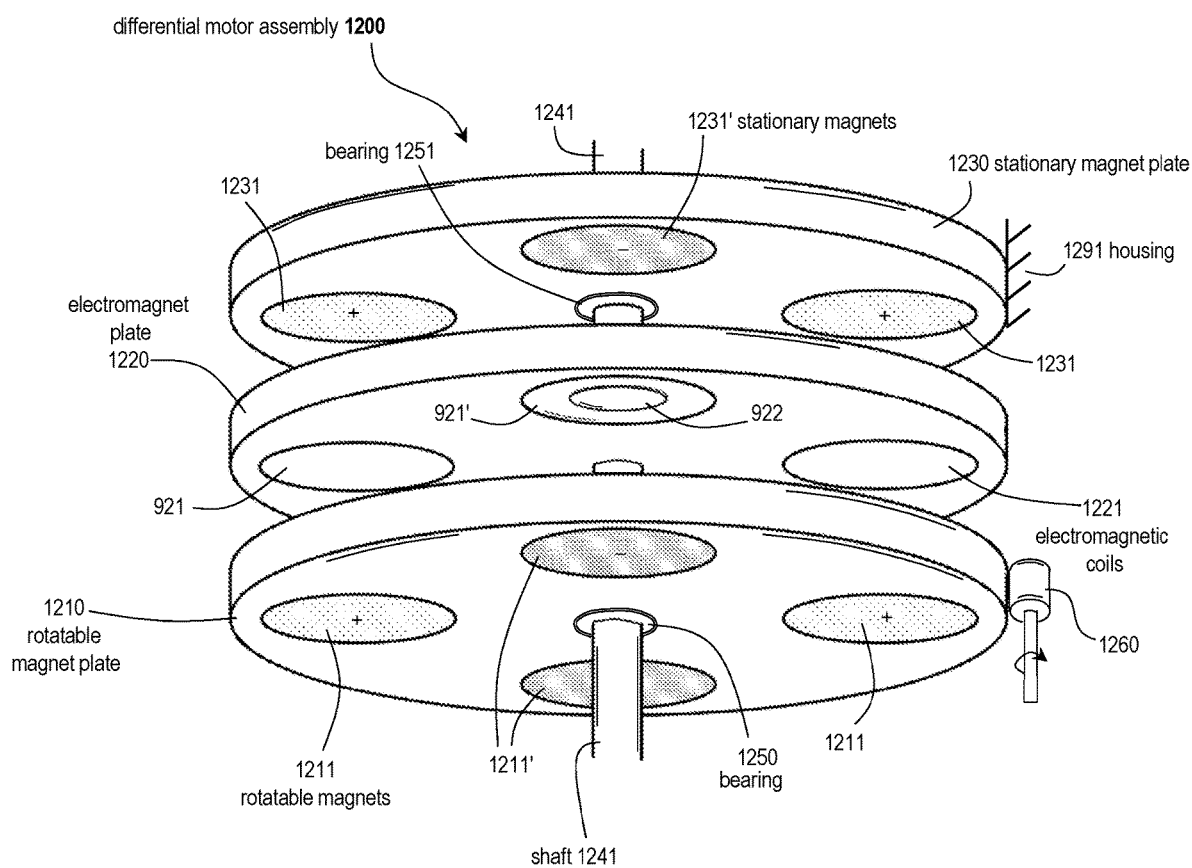
FIG. 12 is a perspective view of a further differential motor assembly with a flywheel, in accordance with at least one embodiment of the disclosure.

The stationary magnets 1231 in the stationary magnet plate 1230 may be of alternating polarity meaning that stationary magnets 1231 may be positive down versus stationary magnets 1231' may be negative down, or vice-a-versa. The rotatable magnets 1211 in the rotatable magnet plate 1210 may be of alternating polarity meaning that rotatable magnets 1211 may be positive down versus stationary magnets 1211' may be negative down, or vice-a-versa. Such alternating arrangement can provide more variability in altering the magnetic field resistance or EMF experienced by the electromagnet coils 1221. Further, directional electromagnets may be used such as electromagnet 1221'- and the direction of such directional electromagnets may be alternated as shown in FIG. 12. For example, such directional electromagnets might be constructed with an insulating backing with an inner core 1222 aimed in a particular direction, as shown in the electromagnet 1231'.

This assembly 1200 also allows the electromagnet coils to generate more power since they can experience a magnetic field on both sides due to both the rotatable magnets 1211 and the stationary magnets 1231. But although this system can have the poles of the rotatable and stationary magnets 1210, 1230 completely in line or completely against each other, the magnets can be in any position between their complete alignment and complete misalignment, to have a variable power output, or motor strength as needed. Wiring may be provided/attached to the electromagnet coils 1221 so as to drive the electromagnetic plate 1220 with current and to output current from the electromagnetic plate 1220.

A system such as the differential motor assembly 1200 can power-up an associated flywheel with either a direct connection or a non-direct system such as a planetary gear set through the output shaft 1241. This can provide more energy storage than just the electromagnetic plate can store. A non-direct connection such as the planetary gear set can allow this differential motor assembly 1200 or other differential motor assemblies described herein to slowly speed up a body, e.g. flywheel, that stores energy in a manner so as to avoid heating up the differential motor assembly 1200 or breaking the differential motor assembly 1200 down from stress. It is appreciated that permanent magnets could be added to a flywheel of the arrangement or other rotating component to suspend or rotationally support such component (with magnetic levitation, for example) in order to lower resistance of such component.

FIG. 13 is an exploded perspective view of a battery 700 in accordance with at least one embodiment of the disclosure. The battery 700 is illustrative of a particular example and implementation of the arrangement shown in FIG. 1, in accordance with at least one embodiment of the disclosure. The battery 700 includes a turntable assembly 710, a unified flywheel or flywheel 740, and an external mount sheet 780. The turntable assembly 710 and the external mount sheet 780 may be secured to each other and secured to a suitable housing. Such securement may be provided utilizing a plurality of vertical bolts that extend through holes in both the turntable assembly 710 and the external mount sheet 780. These bolts may also be attached to a suitable housing to support the battery 700. A central shaft 701 passes through the center of the battery 700. The central shaft were shaft 701 is fixed to the unified flywheel 740 such that when the shaft 701 turns, the unified flywheel 740 also turns. The central shaft 701 can be attached to a suitable physical connection so as to be able to mechanically turn the central shaft 701. For example, such physical connection might be a driveshaft at a service station on a highway, in the situation that the battery 700 is utilized in a vehicle. Such driveshaft would connect to the shaft 701 so as to speed the unified flywheel 740 up to speed. In this manner, kinetic energy would be stored in the unified flywheel 740. The central shaft 701 can also be attached to a further flywheel and/or to a gear arrangement or other arrangements as described herein.

The battery 700 can include bearing or bearings 704 that serve to rotatably support the central shaft 701 so as to allow rotation within external mount sheet 780. The battery 700 can include bearing or bearings 703 that serve to rotatably support the central shaft 701 so as to allow rotation within the turntable assembly 710.

Figure 14:
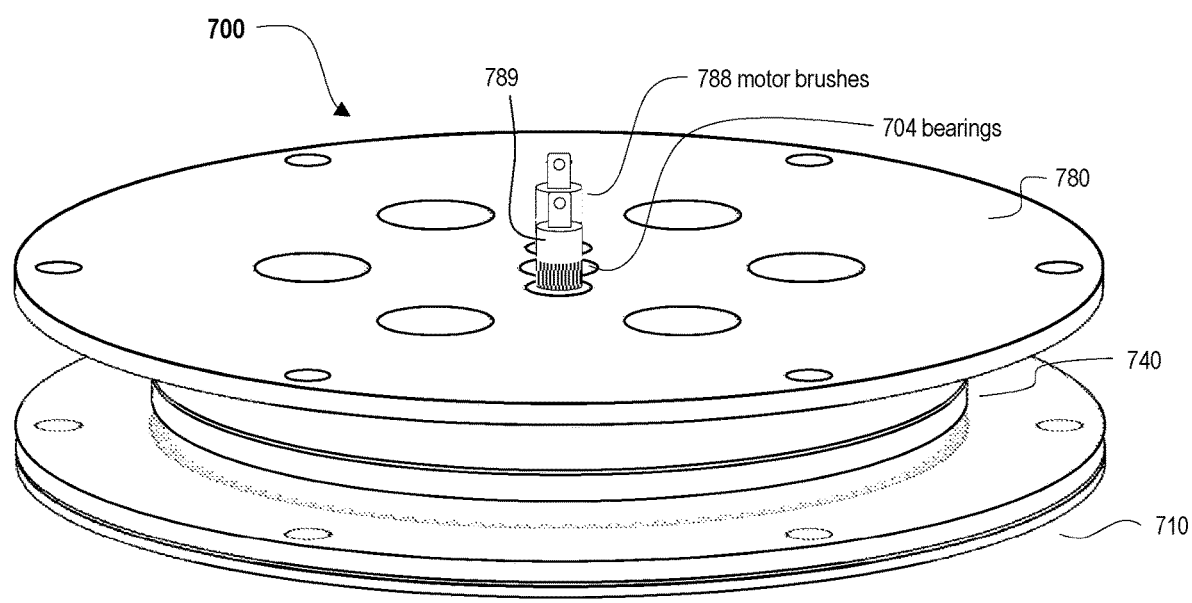
FIG. 14 is an perspective view of the differential motor assembly of FIG. 13, in accordance with at least one embodiment of the disclosure.

FIG. 14 is a perspective view of the battery 700 of FIG. 13 in accordance with at least one embodiment of the disclosure. In particular, FIG. 14 shows motor brushes 788, 789. In manner as described below, the motor brushes 788, 789 interface or engage with a brush pad 790 on the unified flywheel 740. Specifically, the brush pad 790 provided on a flywheel top sheet 770. The motor brushes 788, 789 serve to provide electrical flow to and from the unified flywheel 740. Further details are described below.

Figure 15:
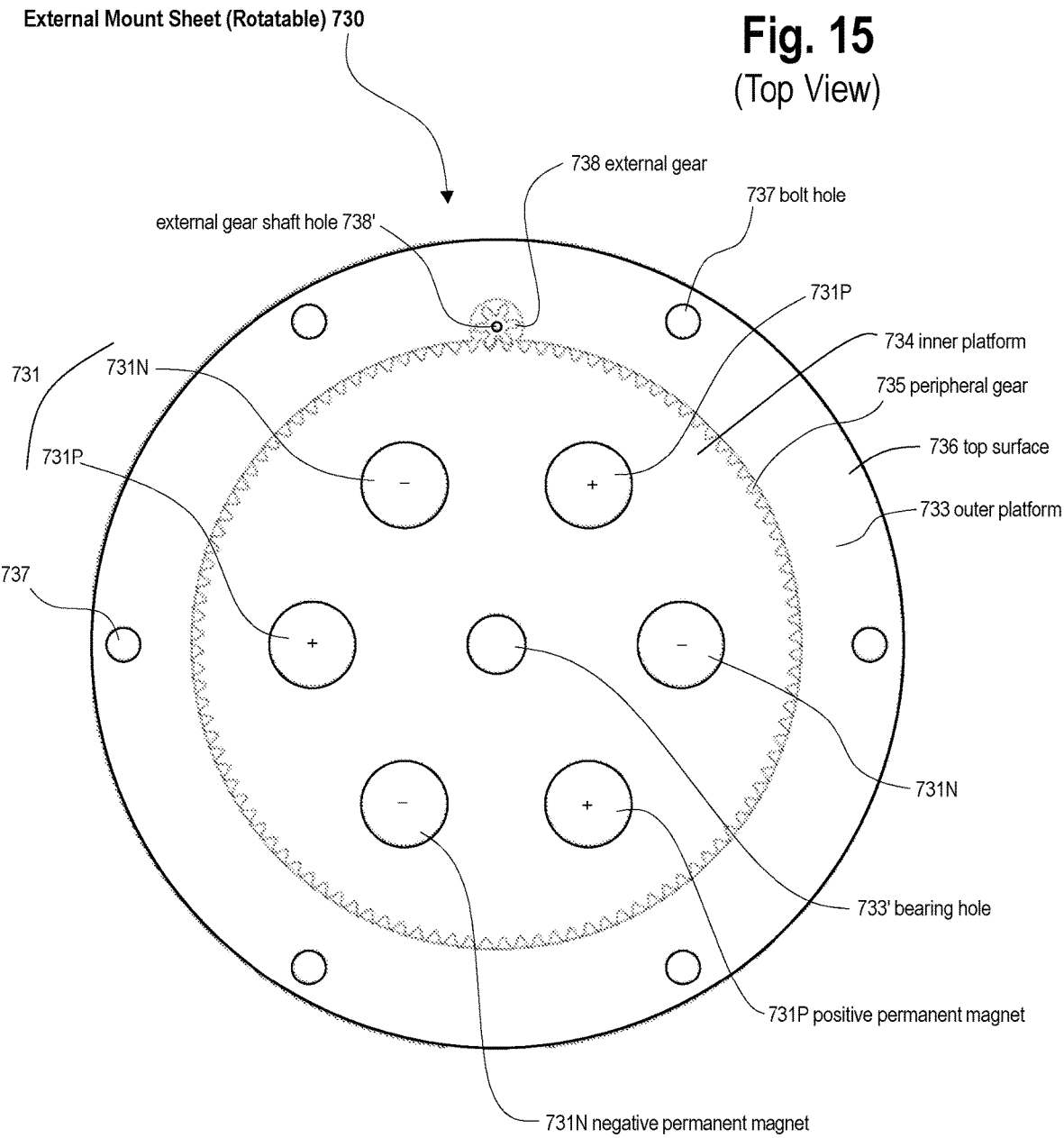
FIG. 15 is a top view of a component of the differential motor assembly of FIG. 14, in accordance with at least one embodiment of the disclosure.

As shown in FIG. 13, the turntable assembly 710 includes an external mount sheet 730 and an external mount sheet backing 720. FIG. 15 is a top view of the external mount sheet 730.

The external mount sheet 730 includes a plurality of bolt holes 737. The bolt holes 737 engage with the vertical bolts 702 so as to support the external mount sheet 730. The external mount sheet 730 also includes an inner platform 734 and an outer platform 733. The outer platform 733 can include a top surface 736 as shown in FIG. 15. The inner platform 734 can rotate within the outer platform 733. The inner platform 734 is provided with peripheral gears or gear rack 735. The peripheral gears 735 interact with external gear 738. The external gear 738 is pivotally attached in a external gear shaft hole 738' in the outer platform 733. Rotation of the external gear 738 can be controlled as described below. The external gear 738 engages with the peripheral gear 735. As a result, as the external gear 738 is rotated, the inner platform 734 is rotated. This allows rotation of a plurality of permanent magnets 731 that are housed in the inner platform 734. Rotation of the inner platform 734 is provided by a bearing hole 733'.

The permanent magnets 731 provided or housed in the inner platform 734 include 6 magnets in the illustrative battery 700. The magnets can be in the form of short cylindrical magnets being positive on one side and negative on another side. The permanent magnets 731, contained in the inner platform 734, alternate between being a negative permanent magnet 731N and a positive permanent magnet 731P. Accordingly, such magnet 731 may be the same magnet but oriented with opposite side up.

Figure 16:
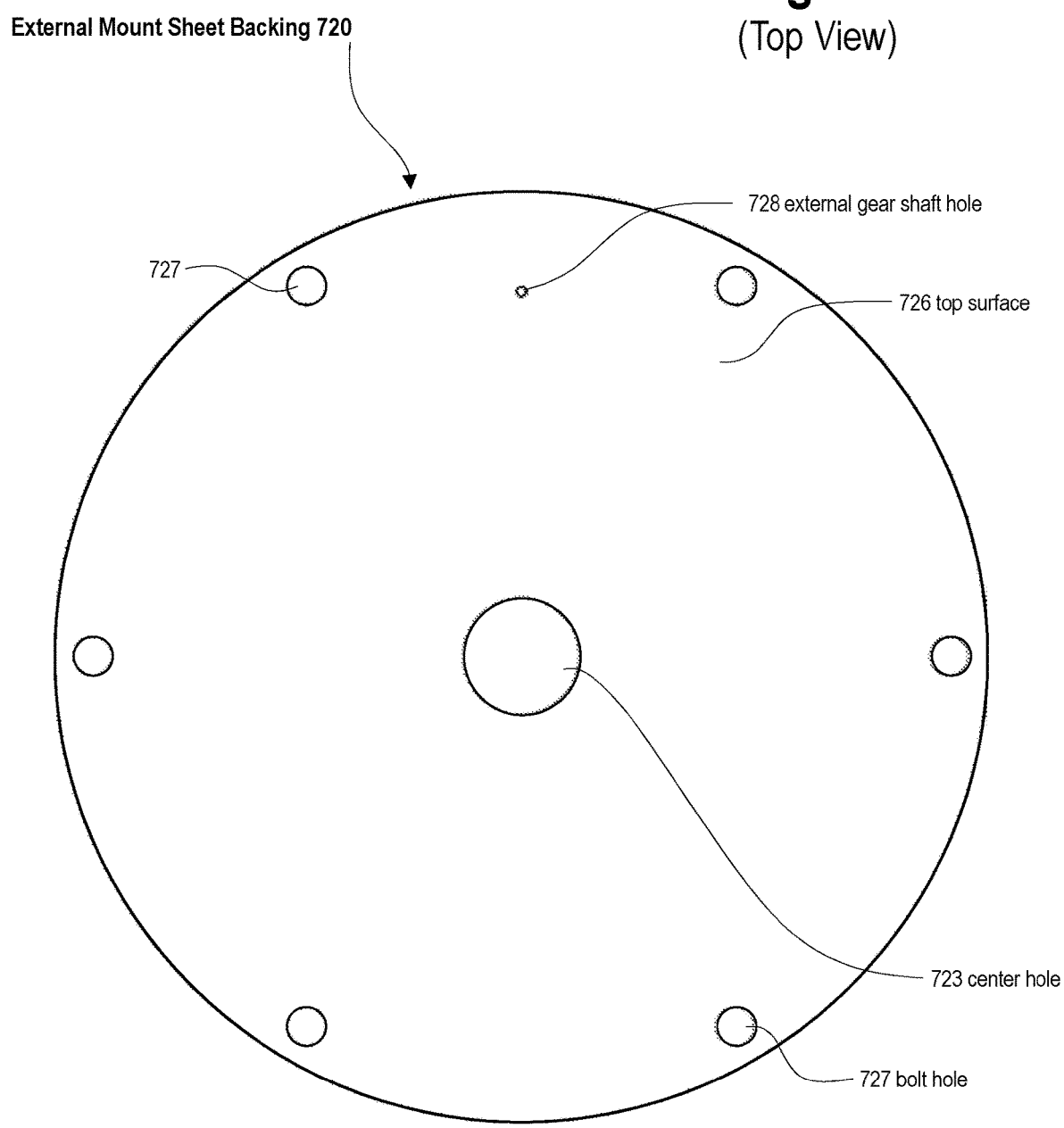
FIG. 16 is a top view of a component of the differential motor assembly of FIG. 14, in accordance with at least one embodiment of the disclosure.

FIG. 16 is a top view of the external mount sheet 720. The external mount sheet backing 720 includes center hole 723. The central shaft 701 passes through the center hole 723. The external mount sheet backing 720 also includes a plurality of bolt holes 727. The bolt holes 727 engage with vertical bolts 702. In this manner, the external mount sheet backing 720 can be connected to the external mount sheet 730. Specifically, the external mount sheet backing 720 can be fixed to the outer platform 733 of the external mount sheet 730.

The external mount sheet backing 720 also includes an external gear shaft hole 728. The external gear shaft hole 728 can serve to secure a shaft that rotatably supports the external gear 738.

The unified flywheel 740 can include a flywheel bottom sheet 750, a flywheel electromagnet plate 760, and a flywheel top sheet 770.

Figure 17:
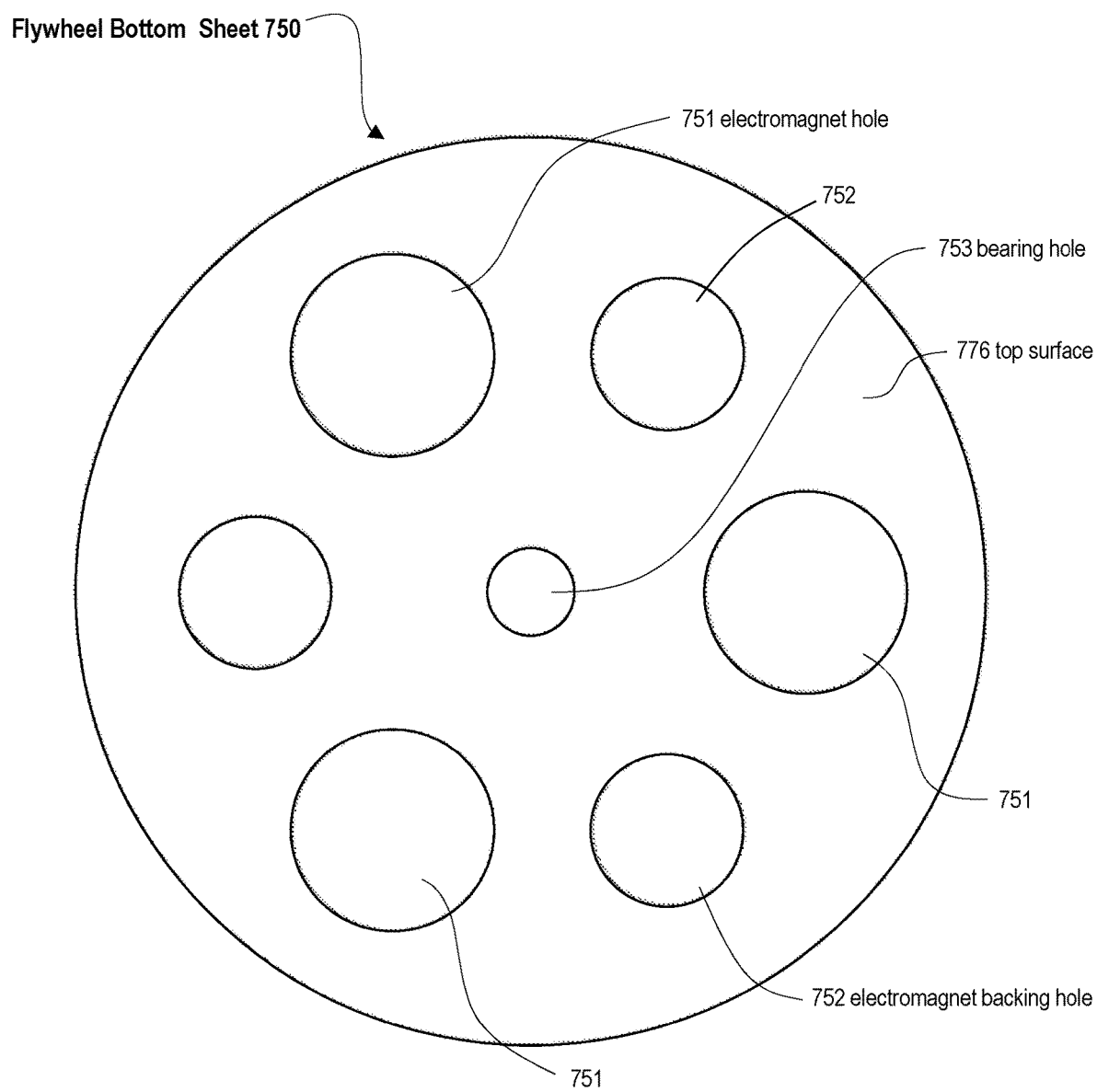
FIG. 17 is a top view of a component of the differential motor assembly of FIG. 14, in accordance with at least one embodiment of the disclosure.

FIG. 17 is a top view of a flywheel bottom sheet 750. The flywheel bottom sheet 750 includes bearing hole 753 that serves to house central shaft 701. The flywheel bottom sheet 750 includes a top surface 776. The flywheel bottom sheet 750 includes a plurality of the electromagnetic holes 751. The flywheel bottom sheet 750 further includes a plurality of electromagnet backing holes 752. The electromagnet holes 751 provide an aperture through which electromagnets can operate. That is, a functional side of an electromagnet may be positioned so as to contact or about the electromagnet holes 751. In this manner, electromagnets are exposed to operate and function. On the other hand, the electromagnet backing hole 752 is provided to support and provide access to a backside of the electromagnet. The backside of the electromagnet might be characterized as the nonfunctional side. The electromagnet backing hole 752 can provide access to an electromagnet as further described below.

Figure 18:
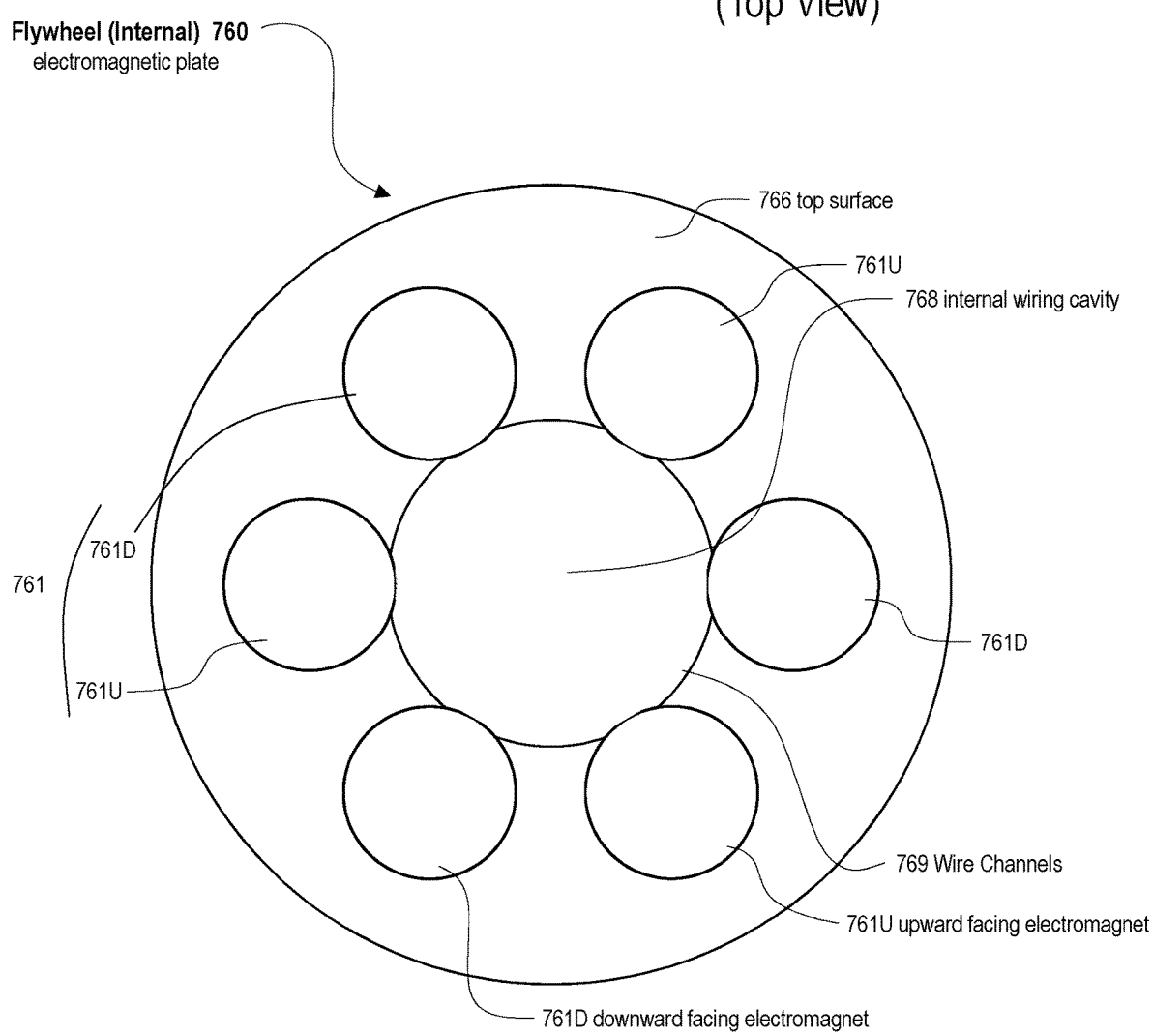
FIG. 18 is a top view of a component of the differential motor assembly of FIG. 14, in accordance with at least one embodiment of the disclosure.

FIG. 18 is a top view of a flywheel electromagnetic plate 760. The flywheel electromagnetic plate 760 can it be adhesive or otherwise affixed to the flywheel bottom sheet 750. Alternatively, mechanical fasteners can be used to affix the flywheel bottom sheet 752 the flywheel electromagnetic plate 760. Similarly, the flywheel top sheet 770 can be affixed to the flywheel electromagnet plate 760 using adhesive or mechanical fasteners.

As shown in FIG. 18, the flywheel electromagnetic plate 760 includes apertures that support a plurality of electromagnets 761. Some of the electromagnets 761 may be upward facing and some of the electromagnets 761 may be downward facing. In the example battery 700 and shown in FIG. 18, there are 3 upward facing electromagnets 761U. additionally, there are 3 downward facing electromagnets 761D. The upward facing electromagnets alternate with the downward facing electromagnets.

Figure 19:
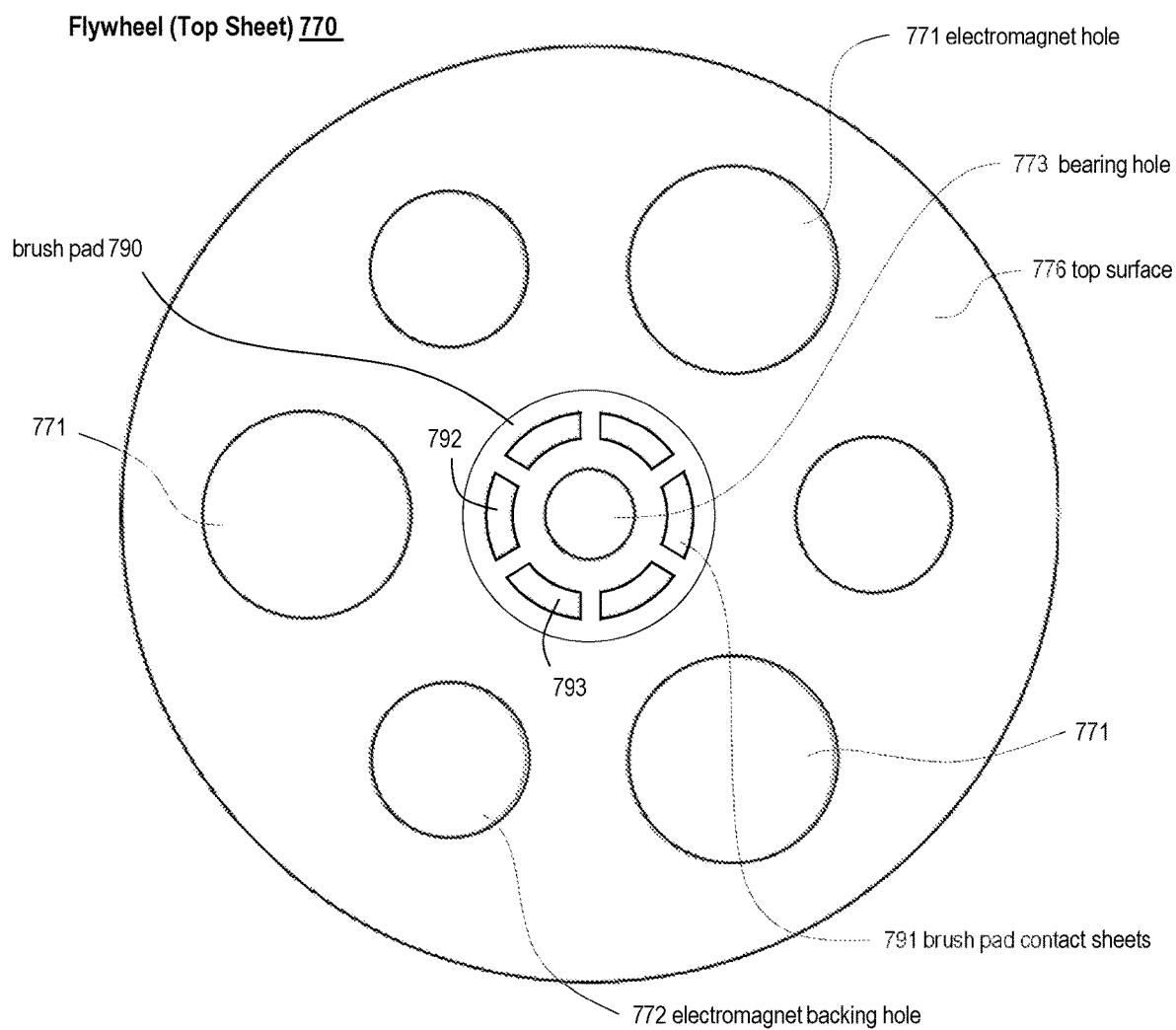
FIG. 19 is a top view of a component of the differential motor assembly of FIG. 14, in accordance with at least one embodiment of the disclosure.

FIG. 19 is a top view of a flywheel top sheet 770. In a manner similar to the flywheel bottom sheet 750, the flywheel top sheet 770 can include a plurality of electromagnet holes 771. The flywheel top sheet 770 can also include a plurality of electromagnet backing holes 772. The holes 771 alternate with the holes 772. As described above, each electromagnet hole 771 provides an opening through which the corresponding electromagnet operates. So as to allow effective operation, the electromagnet hole 771 can be provided to be a diameter that corresponds to a diameter of the particular electromagnet. In similar manner, each electromagnet hole 771 can be provided in a diameter that corresponds to a diameter of the particular electromagnet that is housed therein.

The flywheel top sheet 770 also includes a brush pad 790. The brush pad 790 includes a plurality of brush pad contact sheets 791. The brush pad contact sheets can include what might be characterized as positive contact sheet 792 and negative contact sheet 793. The contact sheets 791 of the brush pad 790 variably contact the motor brushes 788, 789. Further details are described below.

Figure 20:
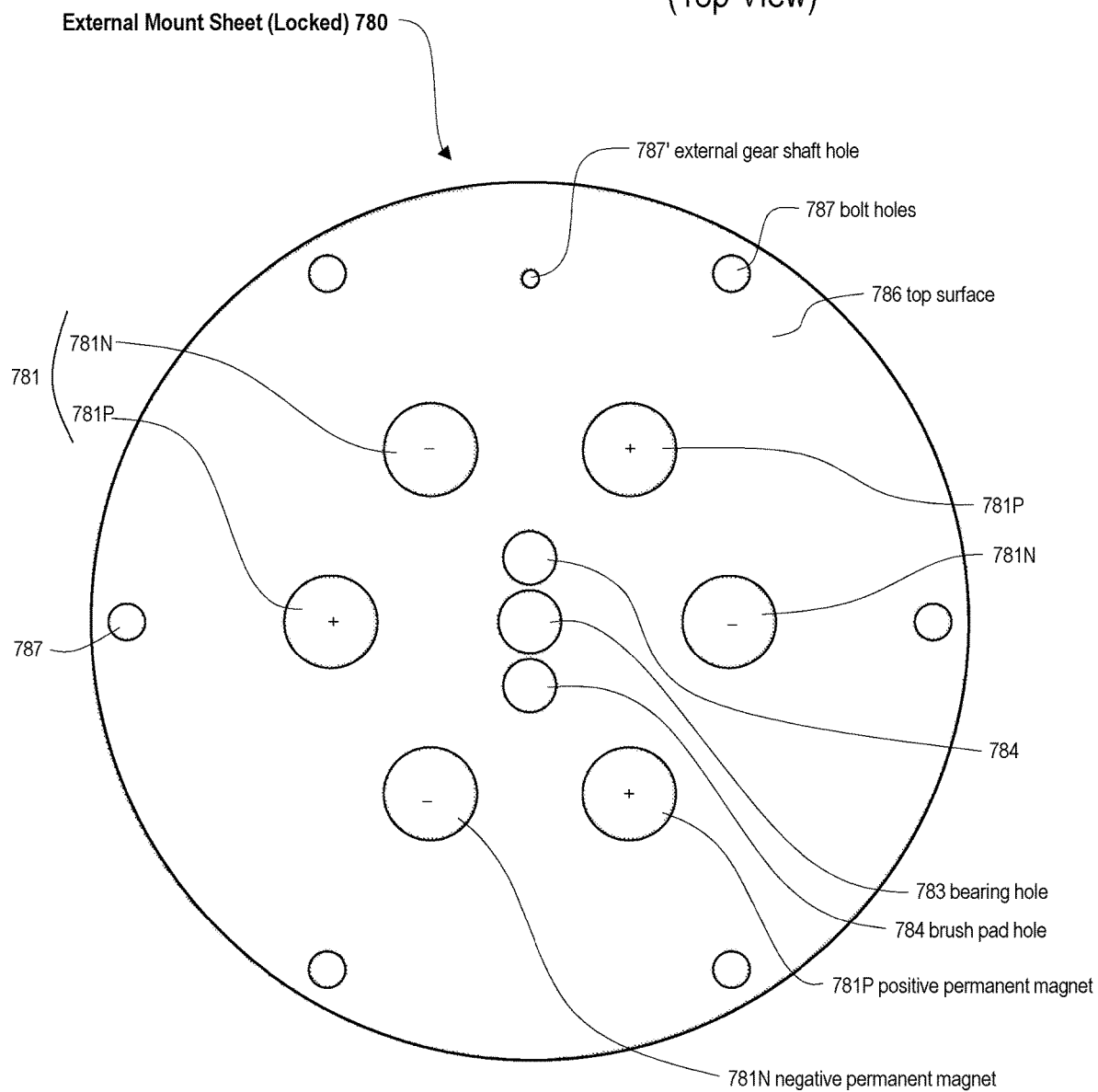
FIG. 20 is a top view of a component of the differential motor assembly of FIG. 14, in accordance with at least one embodiment of the disclosure.

As described above, the battery 700 also includes the external mount sheet 780. FIG. 20 is a top view of the external mount sheet 780, in accordance with at least one embodiment of the disclosure. The external mount sheet 780 includes a plurality of bolt holes 787 that support vertical bolts 702. Accordingly, the external mount sheet 780 may be fixedly attached to the turntable assembly 710. The unified flywheel 740 is allowed and provided to rotate between the external mount sheet 780 and the turntable assembly 710. Accordingly, the unified flywheel 740 may be characterized as being sandwiched between the external mount sheet 780 and the turntable assembly 710.

The external mount sheet 780 includes a bearing hole 783. The bearing hole 783 rotatably houses and supports the central shaft 701. The external mount sheet 780 also includes brush pad holes 784. The brush pad holes 784 provide a pass-through and house the motor brushes 788, 789. The external mount sheet 780 also includes an external gear shaft hole 787', which serves to support a shaft that powers the external gear 738. Relatedly, a rotation motor 739, as shown in FIG. 13, can be affixed to the top surface 786 of the external mount sheet 780. The rotation motor 739 can be controlled by a suitable controller so as to conform rotation of the inner platform 734. This rotation of the inner platform 734, and the permanent magnets 731 provided thereon, allow the spatial position of such permanent magnet 731 to be varied relative to permanent magnets 781 mounted on the external mount sheet 780, as shown in FIG. 20.

That is, as shown in FIG. 20, the external mount sheet 780 can support a plurality of magnets 781. In a manner similar to the permanent magnets 731 of the external mount sheet 730, the permanent magnets 781 are provided to alternate between negative and positive direction. Illustratively, the permanent magnets 781 can include positive permanent magnets 781P and negative permanent magnets 781N.

The electromagnets in the various and assorted diagrams and descriptions can utilize a variety of wiring setups to achieve their particular set of tasks. Example of potential circuits can be either series, parallel, or a culmination of the two. Connecting the electromagnets in series can produce a system where the voltage of the electromagnets is cumulative whilst the amperage remains constant, and connecting them in parallel can likewise maintain the same voltage, but add their amperages together. Culminating the two systems into a mixture will proportionally increase both the voltage and amperage of the system as a whole with respect to the original electromagnets.

FIG. 13 can connect the electromagnets present in the unified flywheel in series as to combine and/or add their voltages. The direct wiring of this series circuit can take place within the internal wiring cavity and/or in slots, for example wire channel(s) 769, of the unified flywheel, and have its positive end and negative end connect to 3 respective alternating brush pads. That is, a particular electromagnet's positive end can connect to 3 first brush pads. Its negative end can connect to 3 second brush pads. The first brush pads and the second brush pads can alternate around the brush pad base, or assembly.

The models represented in the various drawings in this application can utilize a variety of materials, although some may be preferable for certain tasks. Materials which carry a very high tensile strength are particularly good for elements such as the flywheel where maximum rotational speed can dictate the charge capacity of the battery. Virtually all of the non electrical system components can be made out of any material desired, although as previously stated, structural integrity can play a large role in choosing. Some of the electrical components however may be limited to material choice by their conductivity. Examples of this include the brush pad's non conductive portions where the material selected has to be non conductive, and in the cables where a high conductivity may be required to effectively carry current.

Figure 25:
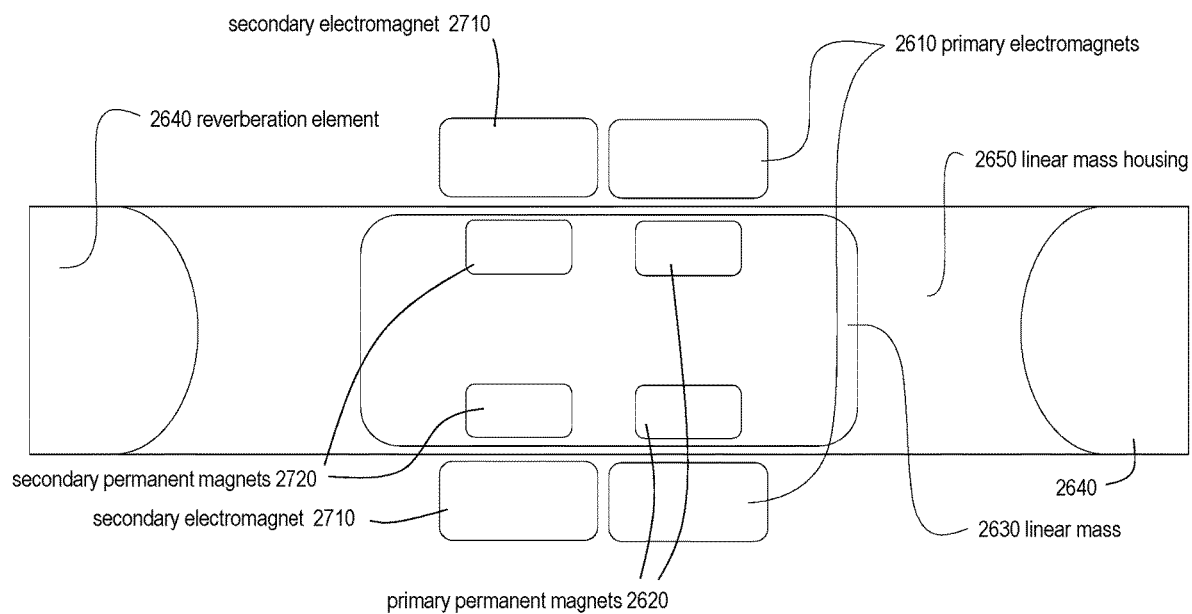
FIG. 25 is a schematic diagram that illustrates a variable linear AC battery, in accordance with at least one embodiment of the disclosure.

Various arrangements including batteries and assemblies are described herein as including permanent magnets and/or electromagnets. It is appreciated that permanent magnets may be switched or swapped with electromagnets as may be desired. Relatedly, it is appreciated that in accordance with one aspect of the invention, an electromagnet is exposed to a varying EMF experience. This varying EMF experience may be controlled by a user, by a suitable control system or through a mechanical system, for example, so as to control the EMF experience of an energy object. For example, an energy object of the invention may be constituted by a flywheel as variously described herein. An energy object of the disclosure may be constituted by a linear mass, such as is shown in FIG. 25. However, the disclosure is not limited to such each energy objects. In accordance with the disclosure, an energy object, which possesses kinetic energy, for example, can be associated or physically affixed with an electromagnet and exposed to varying EMF experiences so as to vary current flowing from such energy object/electromagnet associated with such energy object. The EMF experience may be varied such that no or minimal current flows, or alternatively, such that a maximum amount of current flows. As current flows in a particular battery system of the disclosure, the kinetic energy in the energy object will be depleted. An energy object of the invention can also be associated or physically affixed to a permanent magnet, such as is illustrated in FIG. 25. As position of the electromagnets are varied about the permanent magnet affixed to the energy object, energy flow from such electromagnets can be varied.

It is appreciated that in the various batteries, assemblies, and other arrangements of the disclosure, performance will be affected by various operating attributes, such as friction. For example, in the situation of a rotating flywheel, frictional forces associated with the support of the rotating flywheel will affect performance and the ultimate amount of energy that can be obtained from a given amount of kinetic energy stored in a rotating flywheel. As otherwise described herein, it is appreciated that measures may be taken to address such frictional forces, such as magnetic levitation of energy objects described herein. Such can include magnetic levitation of a flywheel. Other arrangements may be utilized so as to minimize friction and other operating attributes which can affect performance.

Figure 21:
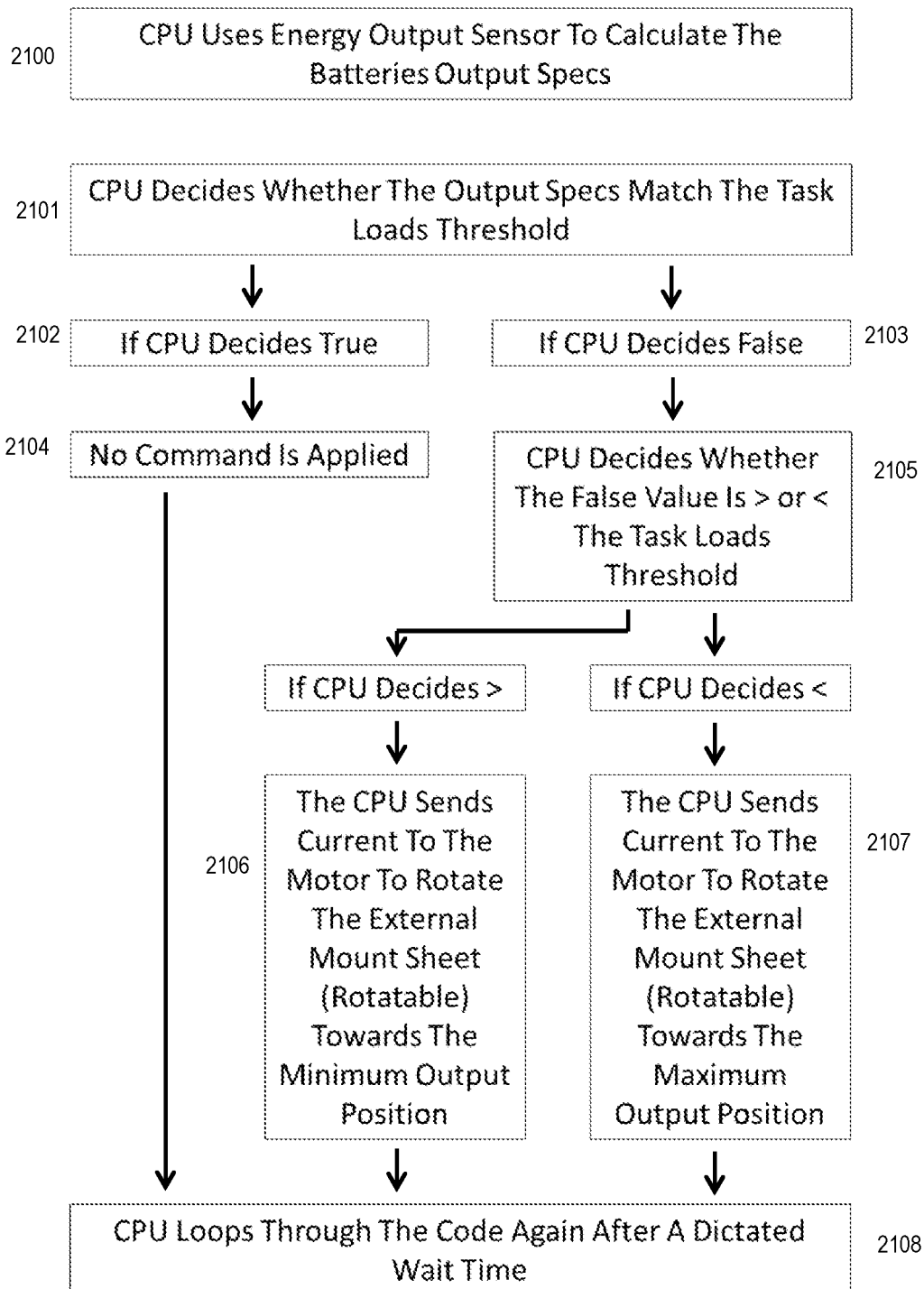
FIG. 21 is a flow chart showing a process of the disclosure, in accordance with at least one embodiment of the disclosure.

FIG. 21 is a flowchart of processing in accordance with at least one embodiment of the disclosure.

FIG. 12 illustrates a possible code sequence that can be used with a variety of the other assemblies illustrated in this disclosure. This particular code sequence can be used to move the tuning magnets to a desired location such that a desired output can be drawn from the system. The first stage of this sequence 2100 tells the CPU to calculate the current energy output of the system via either a predetermined prediction curve, or more commonly an output sensor. The CPU then takes that value and decides whether the current output specs match a task load threshold 2101. If the CPU decides true 2102, then no motor command is applied 2104, and the CPU simply loops back to the top of the code after a wait time 2108. If the CPU decides false 2103 however, a secondary decision is made by the computer 2105 as to whether the false value is greater than or less than the task load threshold.

If the CPU decides greater than, the CPU sends current to the motor to rotate the tuning magnets towards the minimum output position 2106. If the CPU decides less than, it sends current to the motor to rotate the tuning magnets towards the maximum output position 2107. This then leads to a wait time 2108 before the code is looped back through again.

This code sequence or process can be used with a variety of the figures to allow computer controlled adjustment of the systems output to a target value between a certain threshold. A system of this type can be used to allow a computer to match an external electrical load's exact energy draw, to increase efficiency of the energy storage.

Accordingly, the process shown in FIG. 21 can be performed by a suitable computer processor or computer processors. Additionally, it is appreciated that any of a wide variety of attributes, operating parameters, and other data or information may be utilized with the various arrangements of the disclosure.

It is appreciated that one or more arrangements of the disclosure may be used in conjunction with each other. For example, one or more similar batteries or other arrangements may be used in conjunction with each other. One or more different batteries were other arrangements may be used in conjunction with each other.

Figure 22:
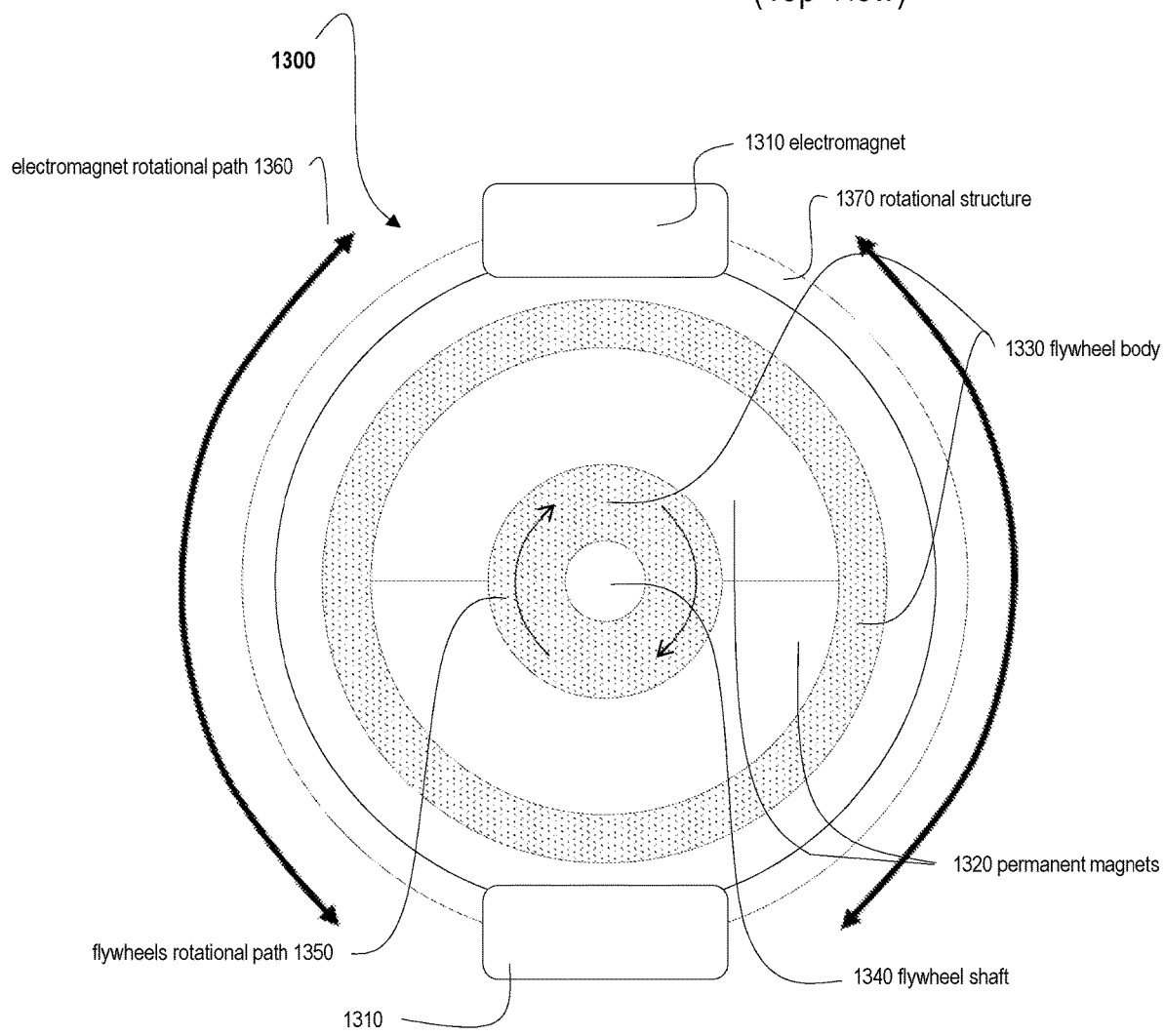
FIG. 22 is a top view of a variable AC layer, in accordance with at least one embodiment of the disclosure.

FIG. 22 is a top view of a top half of a variable output AC generator and variable input AC motor portion, i.e. a variable AC layer 1300, in accordance with at least one embodiment of the disclosure. The flywheel body 1330 is bound to both the permanent magnets 1320 and a flywheel shaft 1340, and rotates within the electromagnets 1310 and a rotational structure 1370. As both the flywheel body, and permanent magnets rotate along the flywheel's rotational path 1350 in relation to the electromagnets, they can produce an electromotive force, whose magnitude is dictated by both the speed of the rotation of the flywheel 1330 in relation to the electromagnets, and the relative distance in radius between the permanent magnets 1320 and the electromagnets 1310. This system shown in the diagram is one half of a larger system as displayed in FIG. 24, but it is understood that this half can still operate as a standard AC (alternating current) motor, which when kinetically charged can act as a permanent magnet AC generator. A battery of this nature of the disclosure stores energy in the rotation of the flywheel or flywheel body 1330, acting as rotational kinetic energy, which can then later be syphoned off as electrical energy, in accordance with the law of conservation of energy. As the center of each of the permanent magnets passes over the centerline of the electromagnet, the electromotive force generated is effectively zero, and the current generated by the system as a whole reverses direction, either from positive to negative, or negative to positive when it carries past the centerline. This diagram of FIG. 22 also denotes a rotational structure 1370 that rotates the electromagnets relative position around the flywheel shaft and the flywheel as a whole. This rotation of the rotational structure along the electromagnet rotational path 1360, and therefore the rotation of the electromagnets along the electromagnet rotational path can be controlled by an external source, and can be shifted to any arbitrary position along its rotation at any given point to achieve a desired position.

Figure 23:
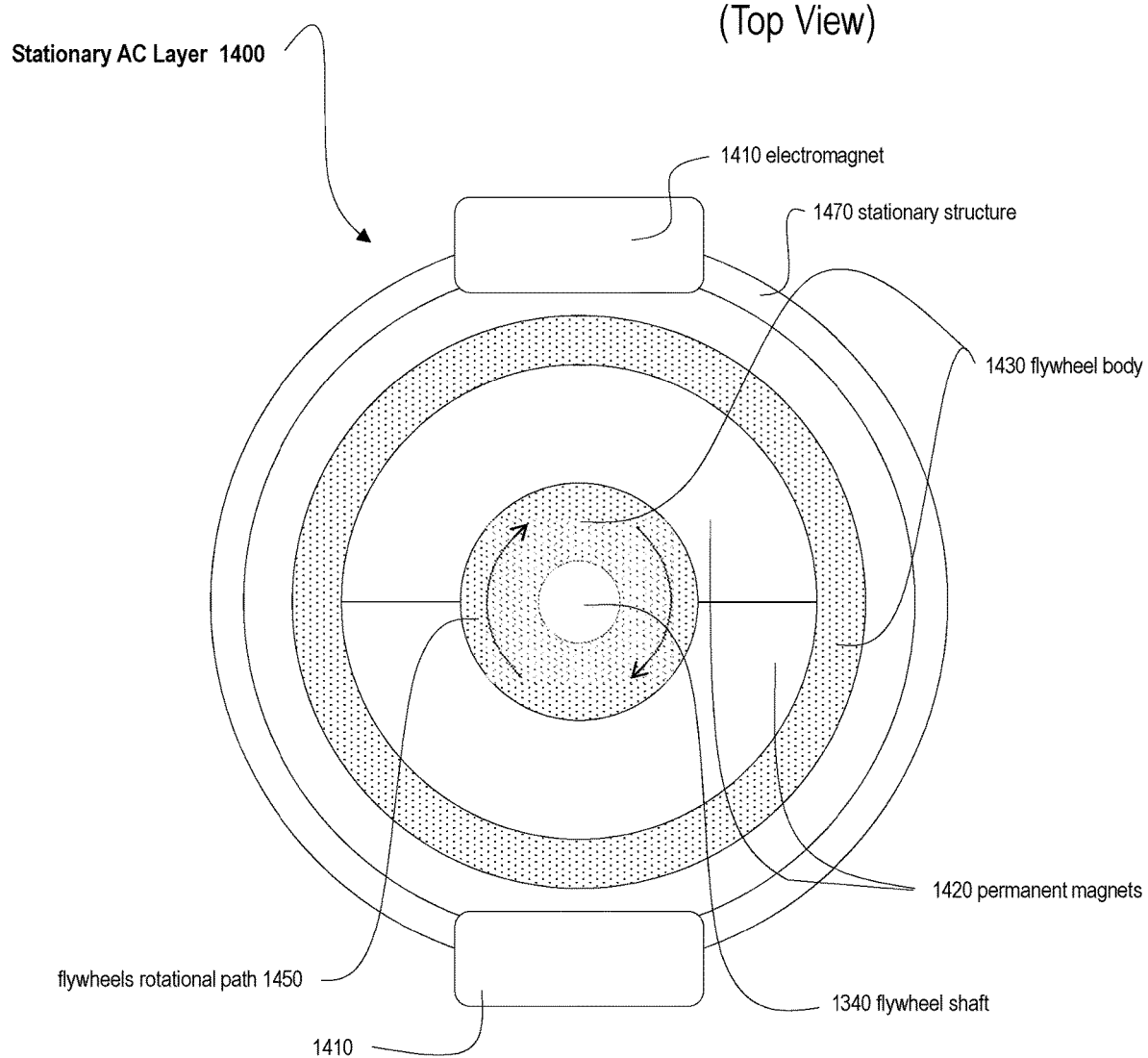
FIG. 23 is a top view of a stationary AC layer, in accordance with at least one embodiment of the disclosure.

FIG. 23 is a top view of a bottom half of a variable output AC generator and variable input AC motor portion 1300, i.e. a stationary AC layer 1400, in accordance with at least one embodiment of the disclosure. The flywheel body 1430 is bound to both the permanent magnets 1420 and a flywheel shaft 1340, and rotates within the electromagnets 1410 and a stationary structure 1470. As both the flywheel body, and permanent magnets rotate along the flywheels rotational path 1450 in relation to the electromagnets, they can produce an electromotive force, whose magnitude is dictated by both the speed of the rotation of the flywheel in relation to the electromagnets, and the relative distance in radius between the permanent magnets and the electromagnets. This system shown in the diagram is one half of a larger system as displayed in FIG. 24, but it is understood that this half can still operate as a standard AC (alternating current) motor, which when kinetically charged can act as a permanent magnet AC generator. A battery of this nature stores energy in the rotation of the flywheel, acting as rotational kinetic energy, which can then later be syphoned off as electrical energy, in accordance with the law of conservation of energy. As the center of each of the permanent magnets passes over the centerline of the electromagnet, the electromotive force generated is effectively zero, and the current generated by the system as a whole reverses direction, either from positive to negative, or negative to positive when it carries past the centerline. This diagram also denotes a stationary structure that can maintain the electromagnets relative position around the flywheel shaft and the flywheel as a whole.

Figure 24:
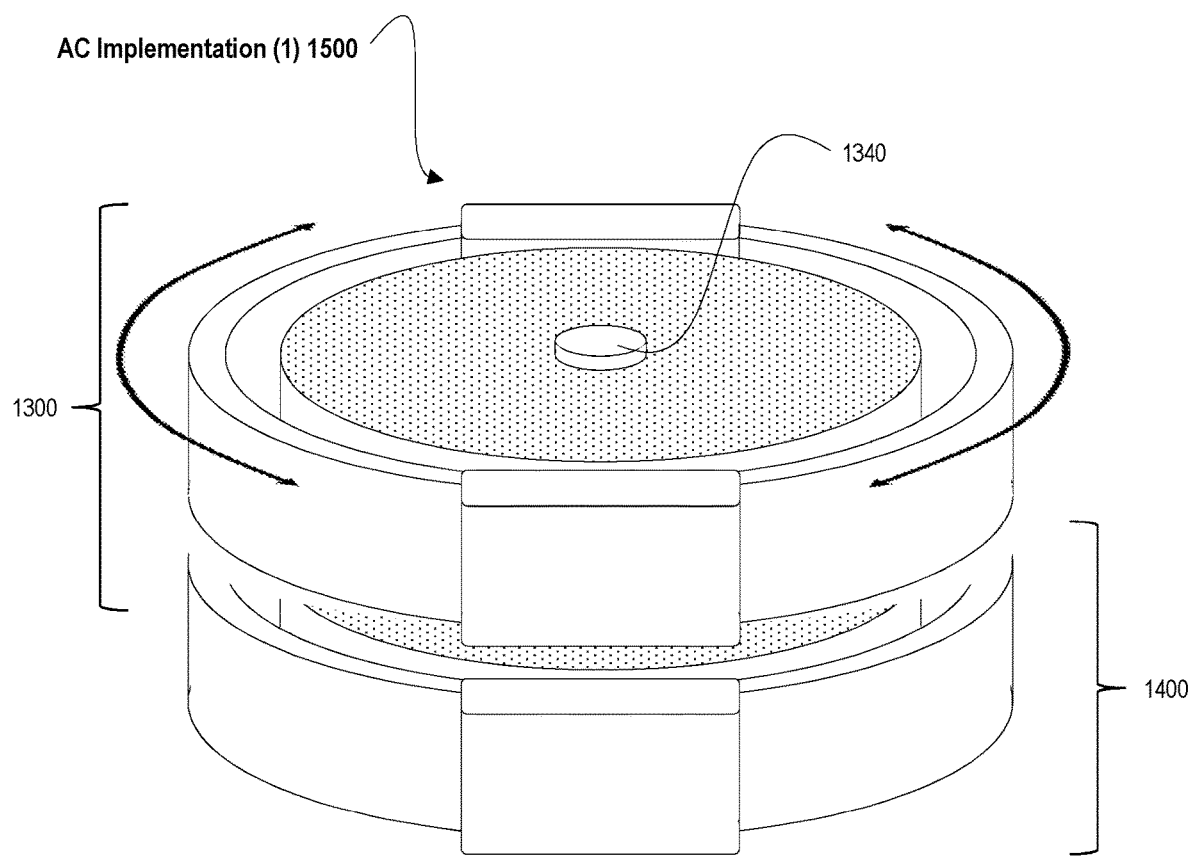
FIG. 24 is a perspective view of an AC implementation system 1500, in accordance with at least one embodiment of the disclosure.

FIG. 24 is a perspective view of an AC implementation system 1500, in accordance with at least one embodiment of the disclosure.

FIG. 24 shows the assembly of both FIG. 22, and FIG. 23, to produce a collective system 1500. This system can bind the two subsystems shown by the other FIGS. 22 and 23 with the central shaft, or by linking the flywheel bodies, and or permanent magnets of FIG. 22, and FIG. 23. This linking of the two subassemblies by the flywheels and or shafts can result in a system where the rotational structure 1370 can rotate relative to both the stationary structure 1470 and the flywheel unit. Because the permanent magnets change the direction of their current output as they pass over the centerline of the permanent magnets, shifting the rotational structure, and in turn the electromagnets 1310, changes the point at which the variable AC layer changes direction of current in regard to the stationary AC layer. While both layers can independently generate electricity and act as a standard AC motor when their outputs are separate, binding the output cables of the two sets of electromagnets allows you to generate a spectrum of outputs ranging from a maximum output, to a minimum output. When the rotational structure is shifted in regard to the stationary structure, you can produce an EMF that is relative to the amount of time the two layers spend aggregating the same direction of current. When the variable AC layer generates current whose direction consistently opposes that of the stationary AC layer, the system as a whole can result in a zero or nearly zero net current flow, caused by the destructive interference of the two electron flows effectively stalling each other out. Because no energy is being syphoned off of the system in the form of electrical output, the rotational speed of the flywheel unit is not diminished or is minimally diminished. However, the position of the rotational structure in relation to the rest of the system can reside in such a way that the variable AC layer generates current in the same direction as the stationary AC layer for part of the flywheels rotation. When this is the case, a partial output will be achieved where current will be syphoned off for the duration of the flywheel unit's rotational travel where the two halves of the subsystem generate similarly flowing current, and current will observe destructive interference in the duration of the rotational travel where the current flows oppose. Such a position can additionally be achieved when the rotational structures of the two halves of the system align the point at which they reverse current directions, during which the output and input of the system will mimic that of a standard AC motor and or generator.

FIG. 25 is a side view of a variable linear AC battery, in accordance with at least one embodiment of the disclosure. The battery includes a linear mass housing 2650. The housing 2650 can be cylindrical in shape. The housing 2650 can be constructed of suitable material such as a plastic material or a metal material, in accordance with respective embodiments of the invention. The battery 2600 includes a linear mass 2630. The linear mass 2630 is energized so as to go back and forth between reverberation element 2640 and reverberation element 2640'. Such back-and-forth or oscillation can be performed at a very rapid pace, for example thousands of times a minute. The linear mass 2630 includes both primary permanent magnets 2620 and secondary permanent magnets 2720. Each of the permanent magnets 2620, 2720, have a North and South polarity. The housing 2650 is provided with permanent magnets 2720, 2710, residing in the interior of the housing 2501—so as to oscillate between opposing ends of the housing. The reverberation elements 2640, 2640' can be in the form of a spring and/or elastic material. In operation, the linear mass 2630 approaches the reverberation element 2640 at speed, impacts the reverberation element 260, and is impacted back from the reverberation element 2640 due to the elastic nature of the reverberation element 2640. The reverberation element 2640' is of similar structure and performs in a similar manner.

Figure 26:
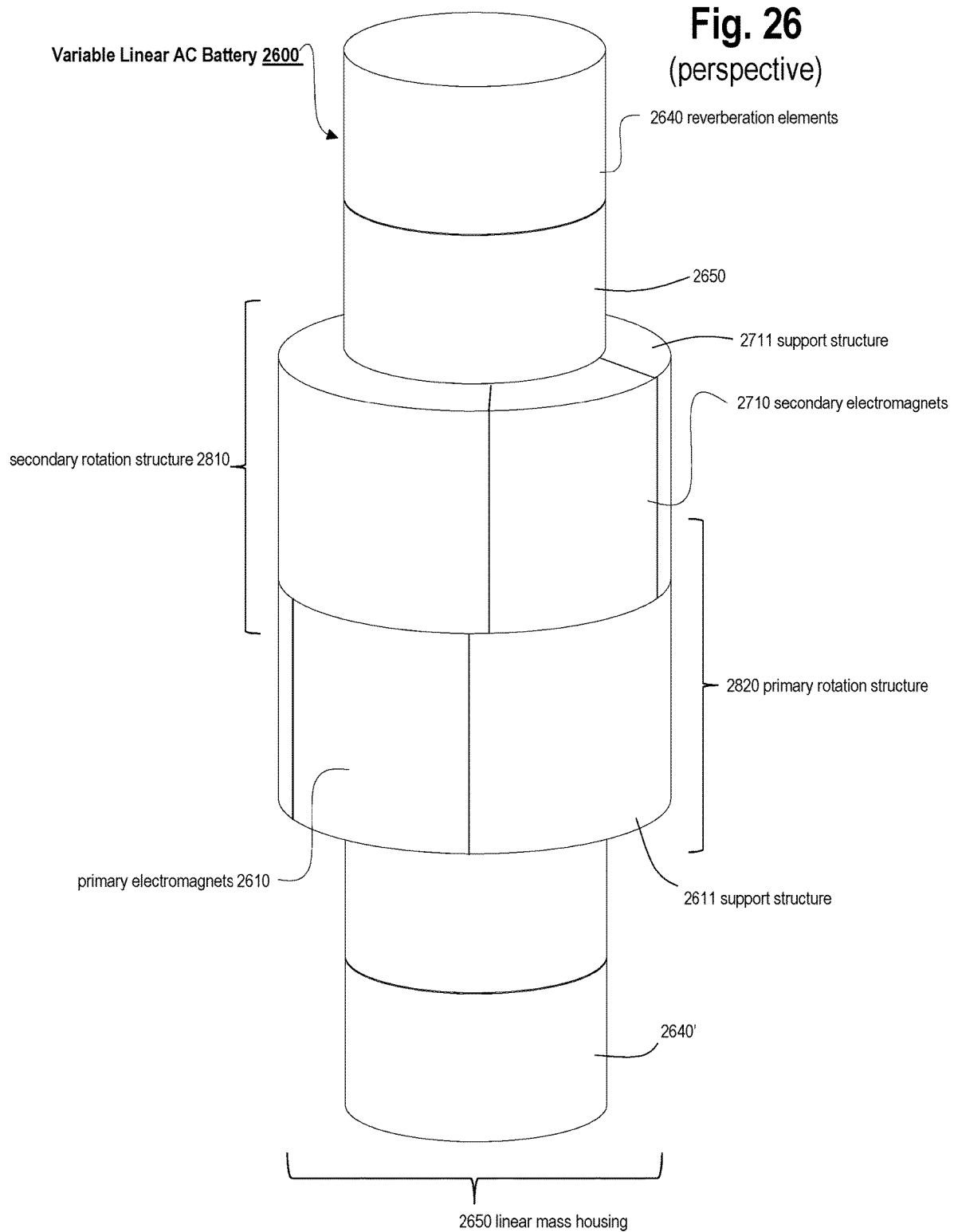
FIG. 26 is a schematic diagram that further illustrates the variable linear AC battery of FIG. 25, in accordance with at least one embodiment of the disclosure.

As shown in FIG. 26, the battery 2600 also includes a secondary electromagnet 2710 and a primary electromagnet 2610. The primary electromagnet 2610 and the secondary electromagnet 2710 are provided so as to be rotatable about an outer periphery of the linear mass housing 2650.

FIG. 26 is a perspective view of the variable linear AC battery 2600, in accordance with at least one embodiment of the disclosure. The battery 2600, as is shown in FIG. 26, includes the reverberation elements 2640, 2640'. The battery 2600 also includes a primary rotation structure 2820 and a secondary rotation structure 2810. Each of the primary rotation structure 2820 and a secondary rotation structure 2810 encircles the linear mass housing 2650 and is allowed to rotate about the linear mass housing 2650. More specifically, the primary rotation structure 2820 includes primary electromagnets 2610 that are supported by a support structure 2611. Primary electromagnets 2610 can be provided on both sides of the support structure 2611.

The secondary rotation structure 2810 includes the secondary electromagnets 2710. Secondary electromagnets 2710 can be provided on both sides of the support structure 2711.

In operation, the primary rotation structure 2820 and the secondary rotation structure 2810 can be selectively rotated about the linear mass housing 2650. Depending on the position of the primary electromagnets 2610 relative to the position of secondary electromagnets 2710, a constructive interference scenario may be established as described above, or alternatively, an additive interference scenario may be established as described above, or yet alternatively, somewhere between such two former scenarios, i.e. such that power may be slowly drained from the battery 2600. As a result, the kinetic energy of the linear mass 2630, oscillating within the linear mass housing 2650, can be selectively siphoned or drained from. As current flows from the variable linear AC battery 2600, the speed at which the linear mass 2630 oscillates will decrease due to conservation of energy. A battery is thus provided.

All of the electromagnets described herein may, as desired, be provided or include wires that connect opposite ends of coils they go to make up the electromagnet. For example, the electromagnets described herein may be provided with a positive wire and a negative wire. Such wires may be characterized as constituting input or output wires. Such wires may provide current to a electromagnet so as to generate the electromagnet. Such wires may output current from any electromagnet upon such electromagnet generating the current that flows out the wire.

Any arrangement, component, or assembly, and similar structure described herein may be provided with a suitable housing so as to contain or house parts of such arrangement, component, or assembly as described herein. Such parts may be fixed statically to a housing as described herein and as desired. Such parts may be movably disposed to a housing as described herein and as desired.

The systems and methods of the disclosure as described herein provide an alternative to traditional batteries, such as chemical batteries. The disclosure provides a way to effectively store energy in a physical form. The disclosure provides the ability to take high watt input energy and convert such input energy into a mechanical force—before pulling energy off the mechanical force created, at a slower pace than such energy was originally input at. Such is one of the core features of the disclosed technology of this patent application. My specific technology is both the concept of storing energy faster than the energy is utilized in accord with aspects of the disclosure, as well as ways of completing this task (as shown in the attached diagrams). Although I have created many ways to produce my end goal of storing energy faster than I export the energy at, using various structure, each version of the disclosure may include its own unique advantages and drawbacks. A further aspect of the technology, of the disclosure, is the ability to utilize movable magnets to change the magnetic field of an electric motor/generator, and ultimately create a transmission that is able to produce any desired current by either having the movable magnets fight against (or enhance) the strength of the original magnets. A similar technique to having two sets of magnets is to have a single set that is either drawn in or pulled out of a motor structure so as to create a desired electrical output. Applications of this energy storage include vehicles and personal power banks (batteries), as well as a wide variety of other applications.

It is appreciated that features and/or characteristics of a particular embodiment described herein may be used in conjunction with other embodiments, as may be desired.

It is appreciated that the various components of embodiments of the disclosure may be made from any of a variety of materials including, for example, plastic, plastic resin, nylon, composite material, foam, rubber, wood, metal, leather and/or ceramic, for example, or any other material as may be desired. For example, the device(s) of this disclosure may be produced from a plastic resin, such as polyethylene, and be injection molding.

A variety of production techniques may be used to make the apparatuses as described herein. For example, suitable textile fabrication, suitable injection molding and other molding techniques and other manufacturing techniques might be utilized. Also, the various components of the apparatuses may be integrally formed, as may be desired, in particular when using molding construction techniques. Also, the various components of the apparatuses may be formed in pieces and connected together in some manner, such as with suitable adhesive and/or heat bonding.

The various apparatuses and components of the apparatuses, as described herein, may be provided in various sizes and/or dimensions, as desired.

It will be appreciated that features, elements and/or characteristics described with respect to one embodiment of the disclosure may be variously used with other embodiments of the disclosure as may be desired.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

It will be understood that when an element or layer is referred to as being "onto" another element or layer, the element or layer can be directly on another element or layer or intervening elements or layers. Examples include "attached onto", secured onto", and "provided onto". In contrast, when an element is referred to as being "directly onto" another element or layer, there are no intervening elements or layers present. As used herein, "onto" and "on to" have been used interchangeably.

It will be understood that when an element or layer is referred to as being "attached to" another element or layer, the element or layer can be directly attached to the another element or layer or intervening elements or layers. In contrast, when an element is referred to as being "attached directly to" another element or layer, there are no intervening elements or layers present. It will be understood that such relationship also is to be understood with regard to: "secured to" versus "secured directly to"; "provided to" versus "provided directly to"; and similar language.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper", "top", "bottom", "left", "right" and the like, may be used herein for ease of description to describe the relationship of one element or feature to another element(s) or feature(s) as illustrated in the drawing figures. It will be understood that spatially relative terms are intended to encompass different orientations of structures in use or operation, in addition to the orientation depicted in the drawing figures. For example, if a device in the drawing figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "including", "comprises" and/or "comprising," and variations thereof, for example, when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to schematic diagrams, diagrams and/or cross-section illustrations, for example, that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of components illustrated herein but are to include deviations in shapes that result, for example, from manufacturing or fabrication.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, as otherwise noted herein, when a particular feature, structure, or characteristic is described in connection with any embodiment, it is submitted that it is within the purview of one skilled in the art to effect and/or use such feature, structure, or characteristic in connection with other ones of the embodiments.

Embodiments are also intended to include or otherwise cover methods of using and methods of manufacturing any or all of the elements disclosed above.

While the subject matter has been described in detail with reference to exemplary embodiments thereof, it will be apparent to one skilled in the art that various changes can be made, and equivalents employed, without departing from the scope of the disclosure.

All related art references discussed herein are hereby incorporated by reference in their entirety. All documents referenced herein are hereby incorporated by reference in their entirety.

The foregoing detailed description has set forth various embodiments of the systems, devices, assemblies and/or processes via the use of block diagrams, flowcharts, and/or examples. Insofar as such block diagrams, flowcharts, and/ or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

Thus, particular embodiments of the subject matter have been described. In some cases, the actions described in accordance with one or more of the embodiments may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It is appreciated that a feature of one embodiment of the disclosure as described herein may be used in conjunction with features of one or more other embodiments as may be desired.

As used herein, "data" and "information" may have been used interchangeably.

Any motorized structure as described herein may utilize gears, linkages, sprocket with chain, or other known mechanical arrangement so as to transfer requisite motion and/or energy.

Hereinafter, further aspects of implementation of the systems and methods of the disclosure will be described.

As described herein, at least some embodiments of the system of the disclosure and various processes, of embodiments, are described as being performed by one or more computer processors. Such one or more computer processors may be in the form of a "processing machine," i.e. a tangibly embodied machine. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, code or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the machine used to implement the disclosure may be in the form of a processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the disclosure.

The processing machine used to implement the invention may utilize a suitable operating system. Thus, embodiments of the disclosure may include a processing machine running the Windows 10 operating system, the Windows 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the disclosure as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment.

Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing is described above is performed by various components and various memories. However, it is appreciated that the processing performed by two distinct components as described above may, in accordance with a further embodiment of the disclosure, be performed by a single component. Further, the processing performed by one distinct component as described above may be performed by two distinct components. In a similar manner, the memory storage performed by two distinct memory portions as described above may, in accordance with a further embodiment of the disclosure, be performed by a single memory portion. Further, the memory storage performed by one distinct memory portion as described above may be performed by two memory portions.

Further, as also described above, various technologies may be used to provide communication between the various processors and/or memories, as well as to allow the processors and/or the memories of the disclosure to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention on a processing machine, for example. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

A suitable programming language may be used in accordance with the various embodiments of the disclosure. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the systems and methods of the disclosure. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, as also described above, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the disclosure.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods of the disclosure, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the systems and methods of the disclosure, it is not necessary that a human user actually interact with a user interface used by the processing machine of the disclosure. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the systems and methods of the disclosure may interact partially with another processing machine or processing machines, while also interacting partially with a human user.

It will be readily understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. An energy apparatus that stores and disperses energy, the energy apparatus comprising:
    an energy object that experiences movement so as to store kinetic energy in the energy object,
        the energy object including a magnet assembly through which electrons are driven resulting in electric output from the magnet assembly, and the electric output dependent on experienced EMF (electro-motive force) that is experienced by the magnet assembly;

a supporting structure that supports the energy object while providing for the movement of the energy object;

a first tuning magnet that is supported adjacent the energy object, the first tuning magnet positionable throughout a range of positions, the positions including a first position and a second position;

a second tuning magnet that is supported adjacent to the energy object;

wherein:

(a) in the first position, the first tuning magnet possesses a first spatial relationship with the second tuning magnet that results in a first aggregation of EMF, and the first aggregation of EMF resulting in the experienced EMF being a first experienced EMF, and the first experienced EMF, with the movement of the energy object, resulting in the electric output being a first electric output, and (b) in the second position, the first tuning magnet possesses a second spatial relationship with the second tuning magnet that results in a second aggregation of EMF, and the second aggregation of EMF resulting in the experienced EMF being a second experienced EMF, and the second experienced EMF, with the movement of the energy object, resulting in the electric output being a second electric output.

2. The apparatus of claim 1, the movement of the energy object is constituted by rotation of the energy object.

3. The apparatus of claim 2, the energy object is a mechanical energy storage device constituted by a rotating flywheel.

4. The apparatus of claim 1, wherein the magnet assembly includes an electromagnet connected to wires, and the electric output being output through the wires.

5. The apparatus of claim 1, the movement of the energy object is constituted by oscillation of the energy object along a linear path, and the oscillation effected by springs or elastic members at opposing ends of the linear path.

6. The apparatus of claim 1, the first position is a first angular position, and the second position is a second angular position.

7. The apparatus of claim 1, the energy object is a flywheel, and the energy apparatus includes structure to speed up the flywheel from an external source.

8. The apparatus of claim 7, the structure to speed up the flywheel from an external source includes a gear arrangement.

9. The apparatus of claim 1, the energy object is a flywheel, and the energy apparatus is configured to speed up the flywheel by inputting current into the energy object.

10. The apparatus of claim 1, the magnet assembly is one of a permanent magnet and an electromagnet.

11. The apparatus of claim 1, the magnet assembly being an electromagnet and the energy object being a flywheel, and the electrical output is output through at least one wire.

12. The apparatus of claim 1, the first position is where EMFs of the first and second tuning magnets are canceled out, as observed by the energy object, resulting in an output of substantially zero.

13. The apparatus of claim 1, the first position is where EMFs of the first and second tuning magnets, as observed by the energy object, are combined.

14. The apparatus of claim 1, an angular position of the second tuning magnet being selectable.

15. The apparatus of claim 1, an angular position of the second tuning magnet being fixed.

16. The apparatus of claim 1, the energy object being a spinning flywheel, and the flywheel supported on bearings, and the energy object being a plurality of electromagnets provided in the flywheel.

* * * * *